(12) United States Patent
Shoji et al.

(10) Patent No.: US 6,222,327 B1
(45) Date of Patent: Apr. 24, 2001

(54) LIGHTING DEVICE FOR ILLUMINATION AND LAMP PROVIDED WITH THE SAME

(75) Inventors: Hiroyuki Shoji; Hideki Miyazaki, both of Hitachi; Yuuichi Namura, Ome, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/593,954

(22) Filed: Jun. 15, 2000

Related U.S. Application Data

(63) Continuation of application No. 09/096,453, filed on Jun. 11, 1998, now Pat. No. 6,124,680, which is a continuation of application No. 08/921,363, filed on Aug. 29, 1997, now Pat. No. 5,977,725.

(30) Foreign Application Priority Data

| Sep. 3, 1996 | (JP) | 8-252499 |
| Sep. 17, 1996 | (JP) | 8-244440 |
| Jun. 12, 1997 | (JP) | 9-154745 |
| Jun. 12, 1997 | (JP) | 9-154752 |
| Jan. 27, 1998 | (JP) | 10-013763 |

(51) Int. Cl.$^7$ .................................................. G05F 1/00
(52) U.S. Cl. ................ 315/291; 315/244; 315/209 R; 315/DIG. 7
(58) Field of Search .................................... 315/291, 244, 315/209 R, 205, 248, DIG. 7; 363/22, 24, 56, 58, 77, 134

(56) References Cited

U.S. PATENT DOCUMENTS

| 4,316,243 | 2/1982 | Archer | 363/132 |
| 4,631,449 | 12/1986 | Peters, Jr. | 315/205 |
| 4,686,428 | 8/1987 | Kuhnei et al. | 315/307 |
| 4,749,914 | 6/1988 | Feher et al. | 315/246 |
| 4,952,849 | 8/1990 | Fellows et al. | 315/307 |
| 5,138,236 | 8/1992 | Bobel et al. | 315/209 R |
| 5,446,350 | 8/1995 | El-Hamamsy | 315/248 |
| 5,559,394 | 9/1996 | Wood | 315/224 |
| 5,614,810 | 3/1997 | Nostwick | 363/207 |
| 5,671,128 | 9/1997 | Nakamura | 363/16 |
| 5,739,645 | 4/1998 | Xia | 315/307 |
| 5,796,214 | 8/1998 | Nerone | 315/209 |
| 5,925,984 | * 7/1999 | Fischer et al. | 315/219 |

FOREIGN PATENT DOCUMENTS

| 37 11 814 A1 | 11/1987 | (DE) . |
| 197 29 768 A1 | 1/1998 | (DE) . |
| 0 806 888 A1 | 11/1997 | (EP) . |
| 8-9655 | 1/1996 | (JP) . |
| 8-37092 | 2/1996 | (JP) . |
| 9-238474 | 9/1997 | (JP) . |

* cited by examiner

Primary Examiner—Haissa Philogene
(74) Attorney, Agent, or Firm—Antonelli, Terry, Stout & Kraus, LLP

(57) ABSTRACT

AC voltage is applied to a resonant unit provided with an inductor and a capacitor AC current is supplied to a discharged tube connected to one of the inductor and the capacitor according to the switching operation of the two power semiconductor elements connected in a bridge manner. The resonant unit and first and second voltage drop units are connected in series between I/O terminals of the bridge and the voltages of the first and the second voltage drop units are applied as signals of opposite phases to control terminals of the two power semiconductor elements.

5 Claims, 16 Drawing Sheets

LIGHTING DEVICE FOR ILLUMINATION AND LAMP PROVIDED WITH THE SAME

REFERENCE TO EARLIER FILED APPLICATION(S)

This application is a continuation of the following earlier filed application(s): Ser. No. 09/096,453 filed Jun. 11, 1998, now U.S. Pat. No. 6,124,680; Ser. No. 08/921,363 filed Aug. 29, 1997, issued as U.S. Pat. No. 5,977,725, the disclosure of which is hereby incorporated by reference.

BACKGROUND OF THE INVENTION

The present invention relates to a lighting device for a discharge tube.

In recent days, a discharge tube (for example, a fluorescent lamp) is more likely to employ a system arranged to convert a DC voltage into a high-frequency AC voltage through the effect of a lighting circuit composed of an inverter and to apply the high-frequency AC voltage into a resonant load circuit containing the discharge tube itself. The resonant load circuit also contains a resonant inductor and a resonant capacitor for setting a resonant frequency. This type of lighting circuit includes an inverter circuit composed of two power semiconductor switching elements connected between a positive and a negative polarities in a half-bridge structure, which is operated to apply the high-frequency AC voltage onto both ends of the resonant load circuit. The waveform of the current flowing through the resonant load circuit (referred to as resonant current) is resonated into a sinusoidal waveform through the effect of the inductor and the capacitor. This resonant current is controlled by changing an operation frequency of the inverter.

As a prior art for stabilizing the driving frequency of a switching element, there has been proposed a stabilizing circuit disclosed in JP-A-8-45685. This circuit provides a half-bridge circuit for supplying an AC voltage to the resonant load circuit containing the discharge lamp and is operated to divide part of the resonant current into a capacitor and a feedback transformer and apply a control signal to the switching element between a high side and a low side of the half-bridge circuit according to a voltage on the secondary side of the feedback transformer. Unlike the normal fluorescent lamp, this prior art discusses the lighting device for an electrodeless fluorescent lamp for generating plasma through magnetic lines of force emitted from an exciting coil. The electrodeless lamp operates to supply high-frequency current of several megahertz to a solenoid type exciting coil and thereby emit magnetic lines of force for generating ions inside of a bulb through the inductive discharge and form those ions as discharge current in a closed loop (plasma) through the effect of electromagnetic coupling applied by the force of magnetization. Mercury vapor in the plasma is excited by the inductive electric field so as to fire ultraviolet rays onto a fluorescent material coated on the inside of the tube on which the ultraviolet rays are converted into visible rays.

SUMMARY OF THE INVENTION

The foregoing prior art is arranged to supply a control signal having the same frequency as the resonant current to the half-bridge circuit through the feedback transformer. That is, this prior art is a self-excited circuit that keeps the half-bridge circuit in operation without any signal supplied from the external and thus is suitable to the high-frequency operation. However, the feedback transformer has self-inductance, which brings about a phase difference between the control signal and the resonant current and furthermore a slip of the frequency of the control signal from a suitable value. The phase difference and the slip of the frequency may allow pass current to flow through the half-bridge circuit, thereby disadvantageously increasing the loss. Hence, a first problem to be solved by the present invention is to provide lighting circuit means which stabilizes at high frequency.

The electrodeless fluorescent lamp to be controlled by the prior art provides an exciting coil. The use of the exciting coil as a resonant inductor may be effective in reducing the cost of parts and the circuit in size. However, the plasma may given an influence onto an equivalent inductance of the exciting coil, which means that the equivalent inductance is varied depending on the luminescent state of the lamp. Hence, a second problem to be solved by the present invention is to implement the lighting circuit that may use the exciting coil of the electrodeless fluorescent lamp as the resonant inductor.

As described above, an object of the present invention is to provide a lighting device which stably operates at a high frequency and is small in size and cost.

The foregoing object may be achieved by a lighting device for illumination for applying an AC voltage to resonating means having an inductor and a capacitor according to the switching operation of two power semiconductor elements connected in bridge and supplying AC current to a discharge tube connected to any one of the inductor and the capacitor, comprising first and second voltage drop means and said resonating means connected in series with an I/O terminal of the bridge, the voltages of the first and the second voltage drop means being applied to each control terminal of the two power semiconductor elements as a signal of an opposite phase.

The object of utilizing the exciting coil of the electrodeless fluorescent lamp may be achieved by comprising a bridge circuit having two power semiconductor elements, a capacitor, the exciting coil, and the first and the second voltage drop means connected in series between I/O terminals of the bridge circuit, wherein the voltages of the first and the second voltage drop means may be applied to each control terminal of the two power semiconductor elements as a signal of an opposite phase through first and second phase shift means.

DETAILED DESCRIPTION OF THE EMBODIMENTS

Figure 1:
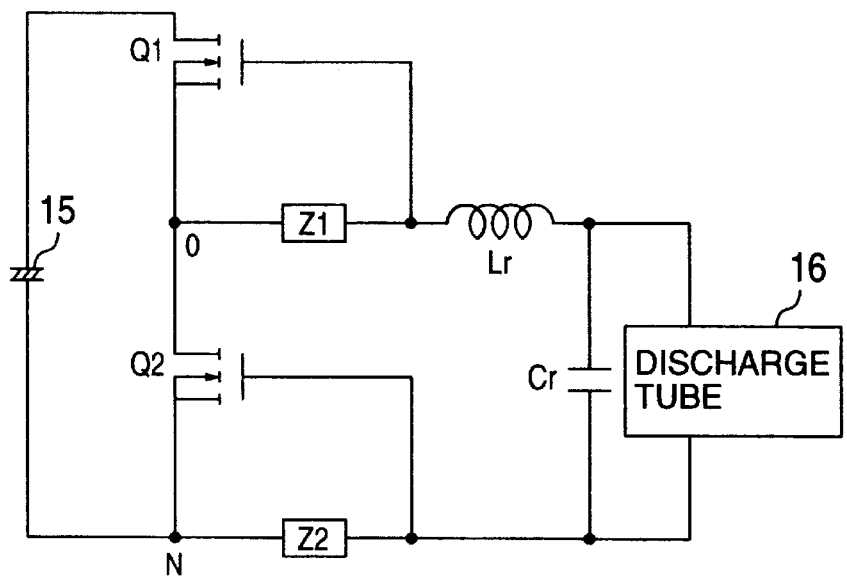
FIG. 1 is a first schematic view showing a lighting circuit according to the present invention.

FIG. 1 is a lighting circuit for supplying AC current to a discharge tube 16. The discharge tube 16 is mainly intended for an electrodeless fluorescent lamp. A voltage source 15 operates to supply a DC voltage to the lighting circuit of the discharge tube 16. Normally, the voltage source 15 operates to rectify an AC voltage through a diode-bridged rectifying circuit and generate a DC voltage. A pair of switching elements Q1 and Q2 connected in series is connected between a positive and a negative electrodes of the voltage source 15, wherein a contact between the switching elements is denoted by O and a contact between the switching element Q2 and the negative electrode of the voltage source 15 is denoted by N. Between the O point and the N point is series-connected voltage drop means Z1 and Z2, a resonant inductor Lr and a resonant capacitor Cr, in which the capacitor Cr provides a discharge tube (or fluorescent lamp) as a load in parallel. Those components compose a resonant load circuit, the current frequency of which is determined by the value of each component. The mutual switching operation of the switching elements Q1 and Q2 is executed to flow bidirectional current through the resonant load circuit, thereby lighting up the discharge tube. The switching element Q1 or Q2 is an n-channel MOSFET, for example, which provides a drain terminal to which current is input, a source terminal from which current is output, and a gate terminal to and from which a control voltage is applied or removed. The application or the removal of the control voltage to or from the gate terminal allows the current flowing between the drain and the source to be conducted or cut off. The MOSFET contains a built-in diode located in the direction from the source terminal to the drain terminal. The diode built in Q1 is QD1 and the diode built in Q2 is QD2. In FIG. 1, the gate circuits of the switching elements Q1 and Q2 correspond to the voltage drop means Z1 and Z2 of the resonant load circuit. The voltage generated by flowing current of the resonant load circuit through Z1 and Z2 is applied to the gate for the purpose of controlling the switching operation of the switching elements Q1 and Q2. The voltages of the voltage drop means Z1 and Z2 caused by the current of the resonant load circuit are opposite in polarity to each other with the O point or the N point as a reference level, which causes the switching elements Q1 and Q2 to be alternately switched. This keeps the self-excited drive in synchronous to the frequency of the current of the resonant load current.

Figure 2:
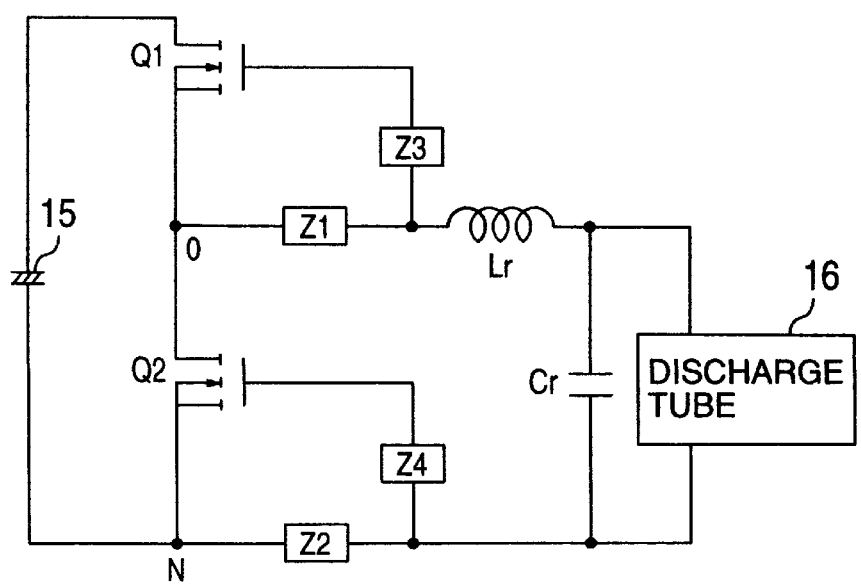
FIG. 2 is a second schematic view showing a lighting circuit according to the present invention.

In the circuit of FIG. 1, the on and off timing of the switching elements Q1 and Q2 is determined by the voltage drop means Z1 and Z2. For adjusting brightness of the discharge tube, the values of Z1 and Z2 are selected. Herein, the adjustment of the brightness of the discharge tube may be achieved by changing the magnitude of resonant current IL. As a switching frequency of the lighting circuit is rising against a resonant frequency of determined by the resonant inductor and the resonant capacitor, the current IL is decreasing. Based on this principle, the lighting device is operated to tune light by controlling the switching frequency f. For example, for reducing the current IL, it is possible to shorten the conducting period of the switching element and thereby enhance the switching frequency. As stated above, in FIG. 1, the voltage drop means operates to tune brightness of the discharge tube. FIG. 2 shows another lighting circuit provided with means for turning brightness. The similar parts of FIG. 2 to those of FIG. 1 have been described with respect to FIG. 1. Hence, the description about those parts is left out. In FIG. 1, the gate circuits of the switching elements Q1 and Q2 are the voltage drop means Z1 and Z2 of the resonant load circuit, while in FIG. 2, phase shift means Z3 and Z4 are provided between the gate terminals of the switching elements Q1 and Q2 and the voltage drop means Z1 and Z2. The phase shift means serve to delay or advance a phase when the voltage of the voltage drop means is applied between a gate and a source of Q1 or Q2. This type of method makes it possible to optionally adjust the on and off timing of Q1 and Q2, thereby being able to tune light.

Figure 3:
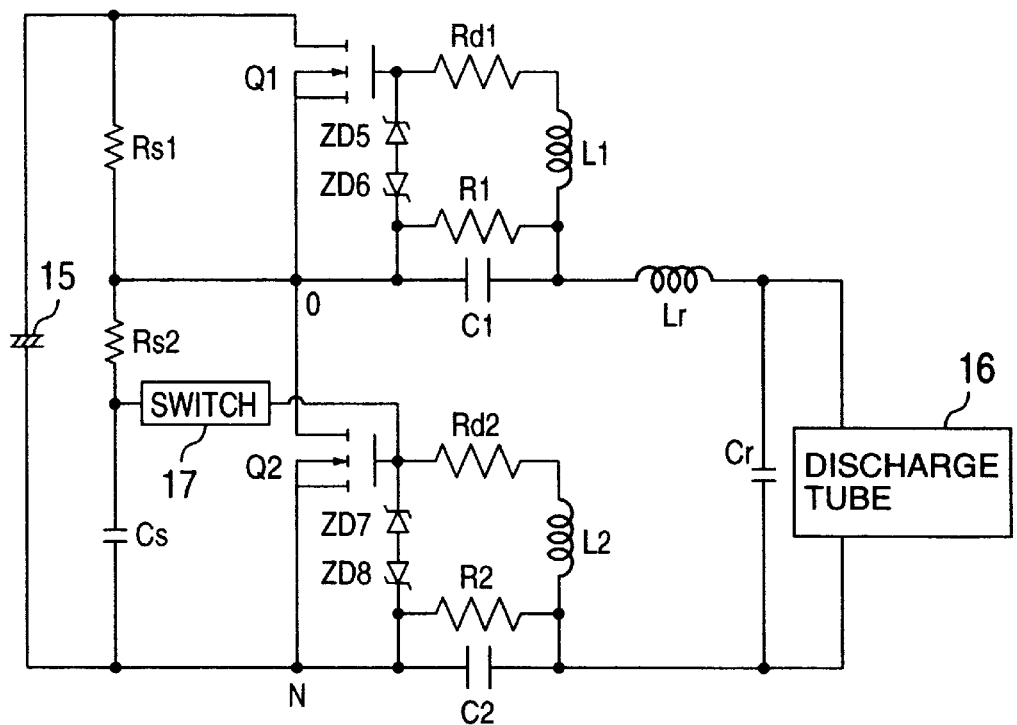
FIG. 3 is a view showing a lighting circuit according to a first embodiment of the present invention.

In FIG. 2, the voltage drop means Z1, Z2 or the phase shift means Z3, Z4 may be a capacitor, an inductor, a resistor or a combination of those components, for example. FIG. 3 shows an embodiment of a concrete lighting circuit having passive elements as the voltage drop means Z1, Z2 and the phase shift means Z3, Z4. In this embodiment, the capacitor C1 served as the voltage drop means is provided between the contact O and the resonant inductor Lr and the capacitor C2 is provided between the resonant capacitor Cr and the contact N. The C1 is connected in parallel to a resistor R1 and the C2 is connected in parallel to a resistor R2. As the resistance is selectively made smaller with the DC components to be overlapped with the voltages of C1 and C2, the voltage of the capacitor is made more variable in similar amplitude with the zero voltage as a reference. The inductor L1 and the resistor Rd1 both served as phase shift means are connected in series between one end of the capacitor C1 and one gate end of Q1. L1 and Rd1 bring about a phase lag when a voltage of C1 is applied between the gate and the source of Q1. Likewise, L2 and Rd2 bring about a phase lag when a voltage of C2 is applied between the gate and the source of Q2. Zener diodes ZD7 and ZD8 coupled in series and in opposite are provided in parallel between the gate and the source of Q1. Likewise, Zener diodes ZD7 and ZD8 are provided in parallel between the gate and the source of Q2. When an excessive voltage is applied between the gate and the source, those Zener diodes serve to prevent breakage of the switching elements. The MOSFET having a Zener diode for preventing an excessive voltage built therein has been made commercially available. In the case of selecting this type of switching element, the foregoing Zener diodes may be removed from the circuit arrangement.

In FIG. 3, for enabling Q1 and Q2 to be alternately switched, it is necessary to provide a circuit for starting the switching operation. Then, the starting circuit will be described below. The starting circuit is arranged to connect resistors Rs1, Rs2 and a starting capacitor Cs in series between a positive and a negative electrodes of the voltage source 15, in which a contact between Rs1 and Rs2 is connected to a contact O between Q1 and Q2. The capacitor Cs is charged up to a starting voltage by the voltage source 15 that feeds a voltage to the capacitor Cs through the resistors Rs1 and Rs2. Between a gate terminal of Q2 and a contact between Rs2 and Cs is provided a bi-directional thyristor 17 called "SIDAC" (Silicon Diode for Alternating Current), which is served as a breakover voltage type switch. In this starting circuit, if the voltage of the starting capacitor Cs is equal to or lower than the breakover voltage of SIDAC 17, the SIDAC 17 is off, when the resonant capacitor Cr is charged by the voltage source 15 through the resistor Rs1. When the voltage of the starting capacitor Cs reaches the breakover voltage, the SIDAC 17 changes the off state into an on state, in which the charges stored in Cs are moved to the capacitance between the gate and the source of Q2. As a result, the switching element Q2 is turned on so that the voltage charged in the resonant capacitor Cr allows the current to flow through the resonant load circuit, thereby enabling the switching elements Q1 and Q2 to alternately start the switching operation. In the constant operating state, for suppressing the action of the starting circuit, it is necessary to suppress the voltage of the starting capacitor Cs to the breakover voltage or lower of the SIDAC 17. In the constant operating state, a voltage at the contact O between Q1 and Q2 corresponds to an alternate voltage of the positive and the negative electrodes of the voltage source 15.

Hence, the time constant of the resistor Rs2 and the capacitor Cs may be set so that the voltage of Cs is lower to the breakover voltage of the SIDAC 17 or lower.

Figure 4:
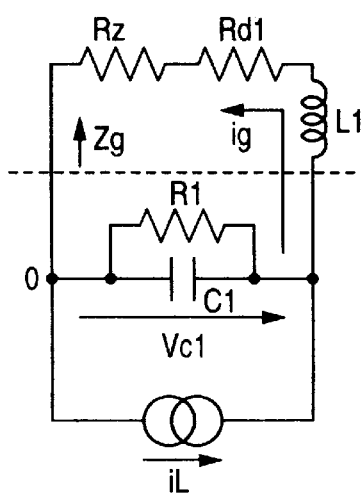
FIG. 4 is a view showing a first equivalent circuit of a gate circuit shown in FIG. 3.
Figure 5:
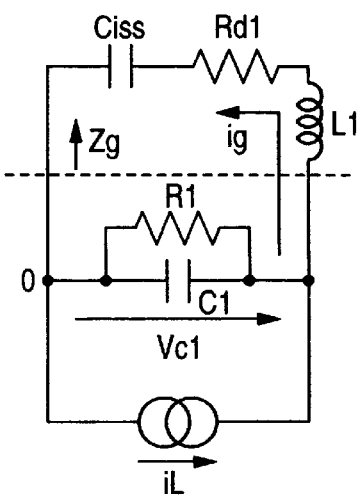
FIG. 5 is a view showing a second equivalent circuit of a gate circuit shown in FIG. 3.

In turn, the gate circuit will be described in detail. For this description, the gate circuit on a high voltage side is used. If the gate circuits are equivalently expressed, each gate circuit may be distinguished on the state of the Zener diode connected to each switching element. FIG. 4 shows an equivalent circuit provided when the Zener diode is turned on. Letting Rz denote an internal resistor of the Zener diode, the resistor Rz is connected in series with the phase shift means L1 and Rd1. In FIG. 4, a synthetic impedance Zg of the resistor Rz and the phase shift means Rd1 and L1 is inductive. In this case, the current ig flowing through L1, Rd1, and Rz indicates a lagged phase rather than the voltage Vc1 of the capacitor with the contact O as a reference level. On the other hand, when the Zener diode is off, the equivalent circuit corresponds to the circuit shown in FIG. 5. Letting Ciss be an input capacitance of Q1, Ciss is connected in series with the phase shift means 11 and Rd1. In FIG. 5, the synthetic impedance Zg of Ciss, L1 and Rd1 is capacitive or inductive depending on the relation of the magnitude and the frequency between Ciss and L1, or if the reactance of Ciss has the same value as that of L1, the synthetic impedance is made to correspond to the resistance. Hence, the current ig flowing the impedance Zg composed of Ciss, L1 and Rd1 indicates an advance or lagged phase or same phase rather than the voltage Vc1 of C1 with the contact O as a reference level.

Herein, in the lighting circuit as shown in FIG. 3, the maximum value of the current flowing through the resonant load circuit is variable depending on the lighting state of the discharge tube 16. When the discharge tube is not lit, the current flowing through the circuit is made larger, so that the voltages Vc1 and Vc2 of the capacitors C1 and C2 are increased. Letting Vz be a Zener voltage of the Zener diode connected to Q1, if Vc1 exceeds Vz, the Zener diode is in the on state, in which case the gate circuit is made to correspond to the equivalent circuit shown in FIG. 4. After the discharge tube is lit, the current flowing through the circuit is reduced, so that the voltages Vc1 and Vc2 of the capacitors C1 and C2 are reduced accordingly. If Vc1 and Vc2 are equal to or lower than Vz, the gate circuit is made to correspond to the equivalent circuit shown in FIG. 5. Herein, the voltage of Ciss is equal to the voltage applied between the gate and the source of Q1. The voltage has a waveform lagged by $\pi/2$ [rad] rather than the current flowing through the pass of L1, Rd1 and Ciss. Letting iL be current flowing through the resonant load circuit, vc denote a voltage of C1, and vg denote a voltage between the gate and the source, iL, vc and vg may be represented as follows.

$$iL = \text{Im} \sin\omega t$$

$$vc = \text{Im}|Z|\sin(\omega t + \phi z)$$

$$vg = \frac{\text{Im}|Z|}{|Zg|} \cdot \frac{1}{\omega Ciss}\sin(\omega t + \phi g)$$

Herein, letting Z be a synthetic impedance of the circuit shown in FIG. 5 and Zg be impedance of Ciss, Li and Rd1 of the circuit shown in FIG. 5, $\phi z$ denote a phase difference between iL and vc, and $\phi g$ denote a phase difference between iL and vg. $\phi z$ is variable depending on the impedances of the voltage drop means Z1, Z2 and the phase shift means Z3, Z4. As stated above, $\phi g$ may be a positive value or a negative one depending on the characteristic of the impedance Zg composed of Ciss, L1 and Rd1 of the gate circuit.

Figure 6:
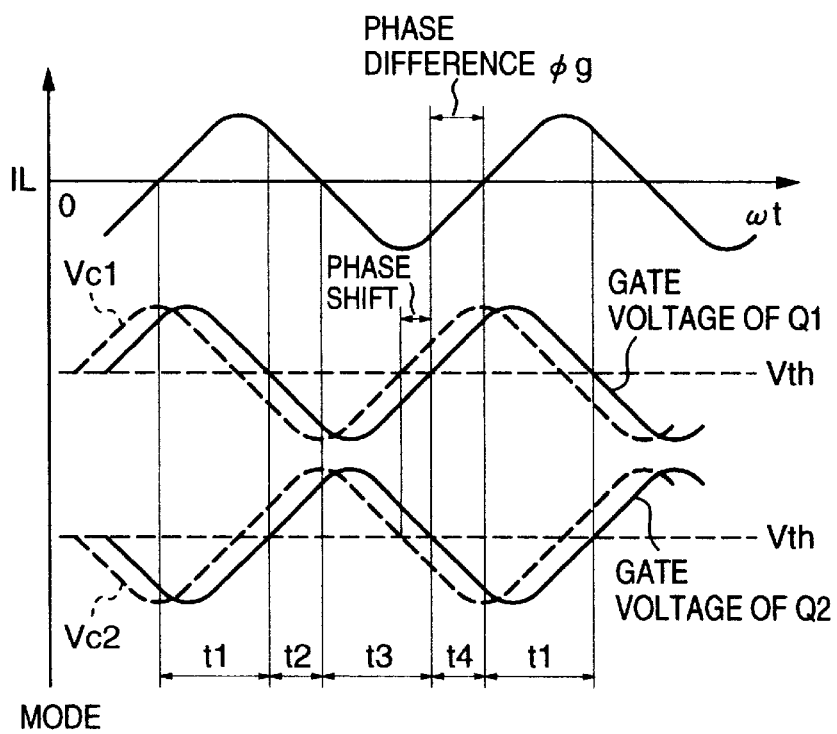
FIG. 6 is an explanatory view showing an operation of an embodiment shown in FIG. 3.

Next, the operation of the circuit shown in FIG. 3 will be described with reference to FIG. 6. FIG. 6 represents a waveform of each component in the embodiment shown in FIG. 3. The discharge tube 16 is provided with high-frequency current by the resonant load circuit composed of Q1, Q2 and Lr, Cr. Assuming that the direction of flowing the current IL of the resonant load circuit from the O point in FIG. 3 is defined to be positive, during one period of the current IL, four operation modes are provided about Q1, Q2 and QD1, QD2. These periods are indicated as t1 to t4 in FIG. 6. Later, each operation mode will be described.

Mode 1 (t1 period): When the switching element Q1 is turned on, the current IL is flown from the capacitor 15 through the passage of Q1, C1, Lr, Cr and C2. The current IL is charged in the capacitor Cr and part of the current IL is branched into the discharge tube 16. Though the current IL is charged in the capacitor C1, the voltage of C1 is represented as Vc1. At the mode 1, the voltage applied between the gate and the source of the switching element Q1 has a voltage waveform depicted in a real line, which lags behind the voltage Vc1 in phase. This voltage waveform indicates a long time passed until the gate voltage of the switching element Q1 becomes lower than a threshold value, that is, until the switching element Q1 is turned off. When the gate voltage is equal to or lower than the threshold voltage of the MOSFET, Q1 is turned off.

On the other hand, the capacitor C2 is charged by IL. Letting Vc2 be a voltage of C2, the capacitor voltage Vc2 indicated in a broken line with an N point as a reference level is increased. The voltage applied between the gate and the source of Q2 is made to have a voltage waveform indicated in a real line, which lags behind the voltage Vc2 in phase. This voltage waveform indicates a long time passed until the gate voltage of Q2 is made lower than the threshold value, that is, until the gate voltage of Q2 is turned off. The present system arranged to make the current IL have a sinusoidal waveform through the effect of Lr and Cr and to turn off Q1 according to the voltage of Vc1 is characterized in turning off Q1 while the current IL keeps its polarity positive. If the value of the voltage drop means C1 is equal to the value of the voltage drop means C2, the voltages Vc1 and Vc2 caused by the current IL flowing through C1 and C2 are equal in magnitude to each other but opposite in polarity to each other with the O point and the N point as a reference level.

Mode 2 (t2 period): When Q1 is turned off, the current IL has a value in positive polarity. This current is kept flowing through the passage of Lr, Cr, C2, QD2 and C1. In addition, part of the current IL is branched into the discharge tube 16.

The current IL serves to charge the capacitor C2. Vc2 is increased and the gate voltage of Q2 is increased with the N point as a reference level. When the gate voltage is greater than or equal to the threshold voltage of the MOSFET, Q2 is turned on. Further, during the mode 2 period, the current polarity is opposite in polarity with Q2 as a reference. As long as the current polarity is kept stable if the gate voltage is charged as shown in FIG. 6, the current is kept flowing through QD2. The mode 2 indicates the period when the polarity of the current IL is changed from the positive to the negative. During this mode period, the voltage Vc1 of C1 is further reduced. This allows the voltage of Vc1 to be applied in a reversely biased manner. Hence, the gate voltage of Q1 does not cause Q to be instaneously turnned on again so that Q1 may be stably turned off.

Mode 3 (t3 period): When the current IL changes from a positive polarity to a negative one, the current IL is flown in Q2 charged with the gate voltage at the mode 2. That is, the current IL is flown as the discharge current of Cr through a passage of Q2, C2, Cr, Lr and C1, and then C2 is charged with the current IL. The current IL serves to reduce the voltage Vc2 so that the voltage Vc2 is made equal to or lower than the threshold voltage of the MOSFET, the switching element Q2 is turned off. Also at the mode 3, like the mode 1, while the current IL keeps the negative polarity, Q2 is turned off. On the other hand, the voltage of C1 is increased with the O point as a reference level.

Mode 4 (t4 period): When Q2 is turned off, the current IL has a value in negative polarity. The current IL is kept flowing through a passage of Lr, C1, Q1, the voltage source 15, C2, Cr, and Lr. In addition, part of the current IL is branched into the discharge tube 16.

The current IL is charged in C1. With increase of Vc1, the gate voltage of Q1 is increased. When the gate voltage is greater than or equal to the threshold voltage of the MOSFET, Q1 is turned on. However, during the mode 4 period, the polarity of the current is opposite as viewed from Q1. As long as the polarity of the current is kept stable if the gate voltage is charged, the current is kept flowing in QD1. The mode 4 corresponds to the period when the polarity of the current IL is changed to a positive value. During this period, the voltage Vc2 of C2 is reduced.

As described above, during one period of the current IL, the operation from the mode 1 to the mode 4 is executed. Later, this operation is repeated.

Figure 7:
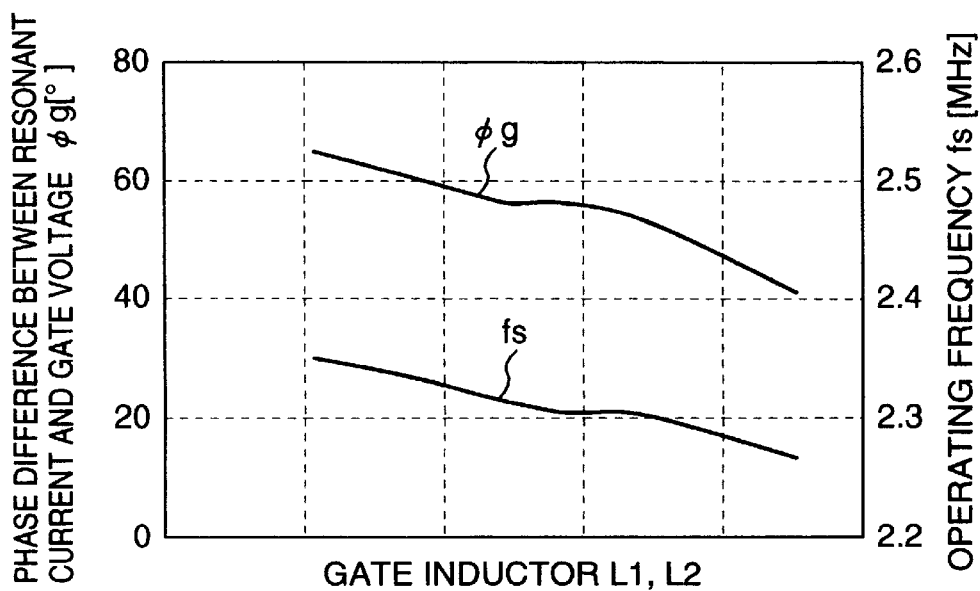
FIG. 7 is a graph showing relation between a phase difference between a resonant current and a gate voltage to be applied to a gate inductor and an operating frequency.

In FIG. 3, letting $\phi g$ be a phase difference of a voltage between the gate and the source of Q1 and Q2 and fs be an operating frequency of the lighting circuit with the values of gate inductors L1 and L2 served as phase shift means as parameters, the characteristic is made to be that shown in FIG. 7. The characteristic will be described with reference to FIG. 5. In the series circuit composed of Ciss, Rd1 and L1, if the reactance of Ciss is larger than that of L1, that is, the reactance of Ciss is capacitive, with increase of L1, the impedance of the series circuit is coming closer to an inductive value. The resulting reactance delays the current flowing through the series circuit and the gate voltage corresponding to the voltage of Ciss. Hence, since the phase difference $\phi g$ of the gate voltage against the resonant load current is made smaller and the conducting period of the switching element is made longer, the switching frequency is made lower. As mentioned above, the provision of the phase shift means makes it possible to optionally adjust the on and off timing of Q1 and Q2, thereby being able to change the operating frequency.

Figure 8:
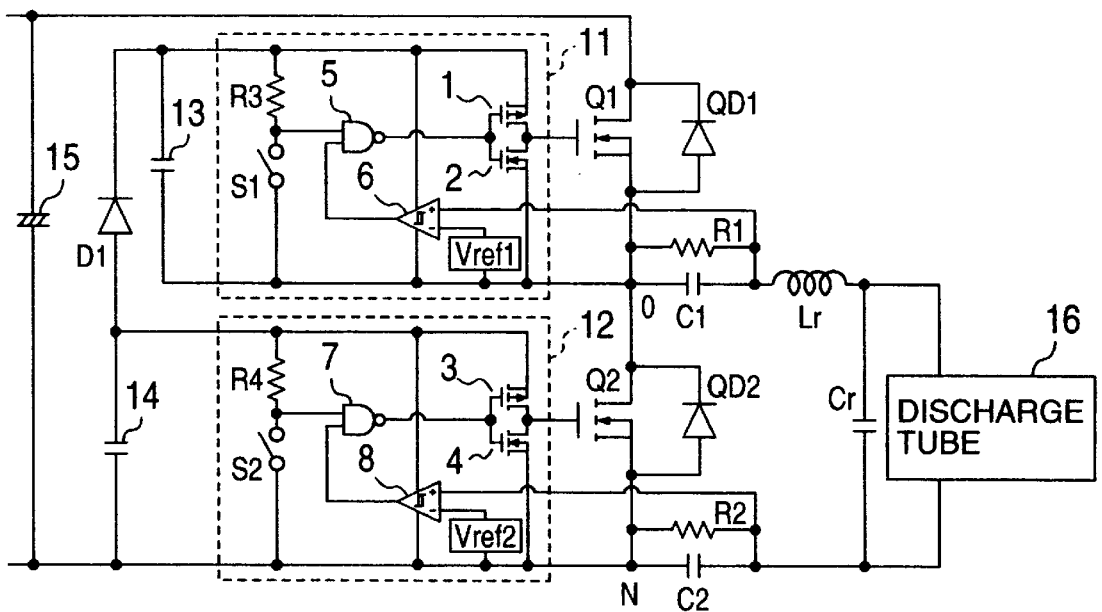
FIG. 8 is a view showing a lighting circuit according to a second embodiment of the present invention.

The foregoing embodiments have been arranged to apply a voltage of the voltage drop means to the switching elements for enabling the switching elements to alternately do the switching operation. On the other hand, the lighting circuit arranged to use the voltage drop means as means for detecting resonant current is illustrated in FIG. 8. The arrangement of the resonant load circuit is likewise to that shown in FIG. 1. Hence, the description thereabout is left out. The driving circuit 11 on the high side for driving Q1 will be described with reference to FIG. 8. The driving circuit 11 provides as a power source a capacitor 13 having a contact O between Q1 and Q2 as a reference level. By turning on Q2, the voltage of a capacitor C14 having an N point as a reference level is charged in a diode D1. This method is called a Bootstrap system, which is described in U.S. Pat. No. 4,316,243. A CMOS inverter composed of elements 1 and 2 is provided between a positive and a negative electrodes of the capacitor 13 and serves to feed its output to the gate of Q1. When the element 1 is turned on (at this time the element 2 is off), the CMOS inverter operates to flow the current with which the voltage is applied to the gate terminal of Q1. Then, when the element 2 is turned on (at this time the element 1 is off), the CMOS inverter serves to flow the current with which the charges charged in the gate terminal of Q1 are discharged. A NAND circuit 5 operates to feed a signal to a control terminal of the CMOS inverter composed of the elements 1 and 2. The voltage of the capacitor C1 is compared with a reference voltage Vref1 with the contact O as a reference level through the effect of a comparator 6. The output of the comparator 6 is applied into the NAND circuit 5. The comparator 16 is inputted with a positive voltage by a power source 15. Further, a starting and stopping means connected in series to the resistor R3 and the switch S1 is provided between both terminals of the capacitor 13. The contact between R3 and S1 is connected to an input of the NAND circuit 5. In FIG. 8, the lighting circuit is started by turning off S1, while it is stopped by turning on S1.

In turn, the description will be oriented to the driving circuit 12 on the low side. The driving circuit 12 has the same arrangement as the driving circuit 11 on the hight side. A power source 12 indicates a capacitor with the N point as a reference level. Between a positive and a negative electrodes of the capacitor 14 is provided a CMOS inverter composed of elements 3 and 4, the output of which is connected to the gate of Q2. The CMOS inverter composed of the elements 3 and 4 provides a control terminal input with a signal from the NAND circuit 7. The voltage of the capacitor C2 is compared with a reference voltage Vref2 with the N point as a reference level through the effect of the comparator 8. The output of the comparator 8 is applied into the NAND circuit 7. It is desirable that the reference voltage Vref1 on the high side is equal to the reference voltage Vref2. Between both terminals of the capacitor 14 is provided a starting and stopping means connected in series to the resistor R4 and the switch S2. The contact between R4 and S2 is connected to an input of the NAND circuit 7. Like S1, by turning off S2, the lighting circuit is started, while by turning of S2, the lighting circuit is stopped.

Figure 9:
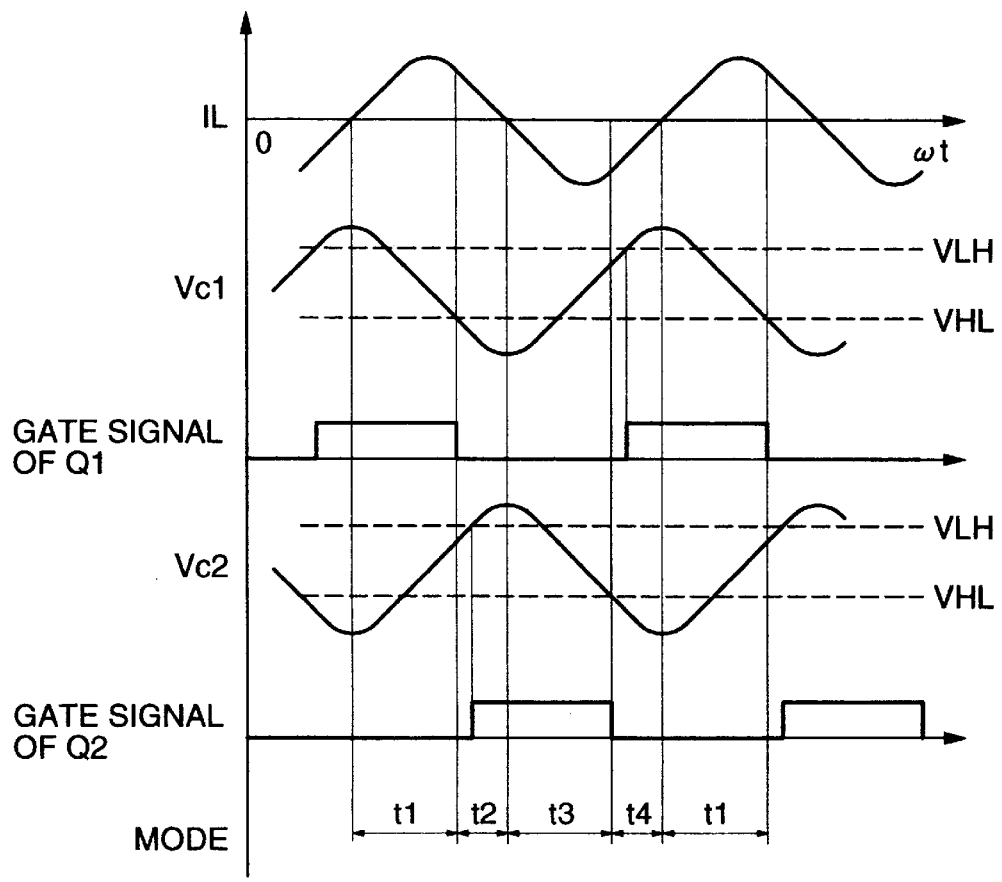
FIG. 9 is an explanatory view showing an operation of the embodiment shown in FIG. 8.

In turn, the description will be oriented to the operation of the lighting circuit with reference to FIG. 9. FIG. 9 shows a waveform of each component included in the embodiment shown in FIG. 8. Later, each operation mode will be described with reference to FIG. 9.

Mode 1 (t1 period): When Q1 is turned on, the voltage source 15 starts to flow the current IL through a passage of Q1, C1, Lr, Cr and C2. The current IL is charged in the capacitor C1 and the voltage Vc1 is reduced with the O point as a reference level. The voltage Vc1 is compared with a reference voltage Vref1 (VHL) through the effect of the comparator 6. When the voltage Vc1 is made lower than the reference voltage Vref1, the output of the comparator 6 is changed from HIGH to LOW. This output is received by the NAND circuit 5. Then, the element 2 of the CMOS inverter is turned on so that Q1 discharges the gate voltage and is turned off.

The operation continued up to this point is the mode 1. The capacitor C2 is charged by the current IL, so that the voltage Vc2 is increased but does not reach the reference voltage Vref2 (VHL). Hence, Q2 is kept off.

Mode 2 (t2 period): When Q1 is turned off, the current IL has a value of a positive polarity, so that the current is kept flowing through a passage of Lr, Cr, C2, QD2 and C1. In addition, part of the current IL is branched into the discharge tube 16.

The current IL is charged in C2 so that Vc2 is increased with the N point as a reference level. When Vc2 reaches Vref2 (VLH), the output of the comparator 8 is changed from LOW to HIGH and is received by the NAND circuit 7. The element 3 of the CMOS inverter is turned on for charging the gate voltage of Q2. During the mode 2 period, the current polarity is opposite as viewed from Q2. As shown in FIG. 8, if the gate voltage is charged, the current is kept flowing through QD2 as long as the current polarity is changed. The period to change of the polarity of the current IL to a negative one corresponds to the mode 2, during which the voltage Vc2 of C2 is progressively increased and the voltage Vc1 of C1 is further reduced.

Mode 3 (t3 period): When the polarity of the current IL is changed from a positive value to a negative one, the current IL starts to flow through Q2 whose gate voltage is charged at the mode 2. That is, the current IL flows as discharge current through Q2, C2, Cr, Lr, and C1. The current IL serves to reduce the voltage Vc2. The Vc2 is compared with the Vref2 (VHL) by the comparator 8. When the Vc2 is lower than the Vref2, the output of the comparator is changed from HIGH to LOW and then is received by the NAND circuit 7. Then, the element 4 of the CMOS inverter is turned on so that the Q2 discharges the gate voltage of Q2 and then is turned off.

The operation up to this point corresponds to the mode 3. The capacitor C1 is charged by the current IL. The Vc1 is increased but does not reach the reference voltage Vref1 (VLH). Hence, the Q1 is kept off.

Mode 4 (t4 period): When the Q2 is turned off, the current IL has a value of a negative polarity. The electromagnetic energy accumulated in Lr serves to keep the current IL flowing through a passage of Lr, C1, QD1, the voltage source 15, C2, Cr, and Lr. In addition, part of the current IL is branched into the discharge tube 16.

The current IL is charged in C1 so that Vc1 is increased. When Vc1 exceeds Vref1 (VLH), the output of the comparator 6 is changed from LOW to High and then is received by the NAND circuit 5. Then, the element 1 of the CMOS inverter is turned on so that the gate voltage of Q1 is charged. However, during the mode 4 period, the current polarity is opposite as viewed from Q1. Hence, if the gate voltage is charged, the current is kept flowing through QD1 as long as the current polarity is changed. The period to the change of the polarity of the current IL to a positive value corresponds to the mode 4. During this period, the voltage Vc1 of C1 is progressively increased and the voltage Vc2 of C2 is further reduced.

During one period of the current IL, the operation from the mode 1 to the mode 4 is executed. After that, this operation is repeated.

In turn, the description will be oriented to the method of tuning brightness of the discharge tube. For example, for reducing the current IL, it is possible to shorten the conducting period of the switching elements Q1 and Q2.

According to the present invention, the reference voltage is controlled so that the time taken in making the voltage of the capacitor C1 or C2 lower than the reference voltage Vref (VHL) is shortened. In FIG. 8, on the driving circuit on the low side, the comparator 8 is provided for comparing the voltage of the capacitor C2 with the reference voltage Vref 2 and feeding a signal to the NAND circuit 7. By making the reference voltage Vref2 (VHL) of the comparator 8 higher than VHL at a normal lighting time by a dimming signal given on any timing, the conducting period of Q2 may be reduced. The change of the reference voltage Vref2 on the low side through this method makes it possible to tune light.

Figure 10:
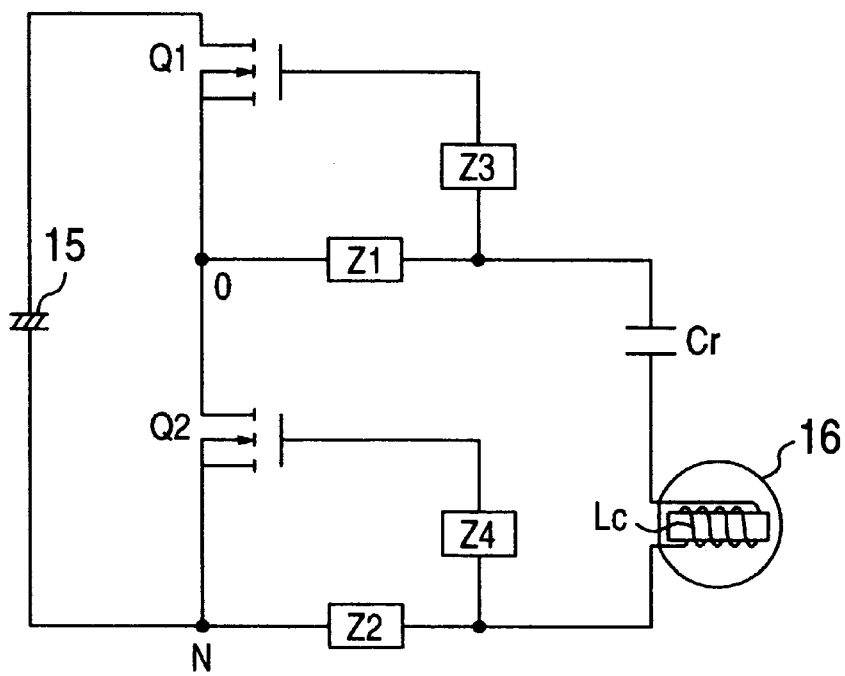
FIG. 10 is a third schematic diagram showing a lighting circuit according to the present invention.
Figure 11:
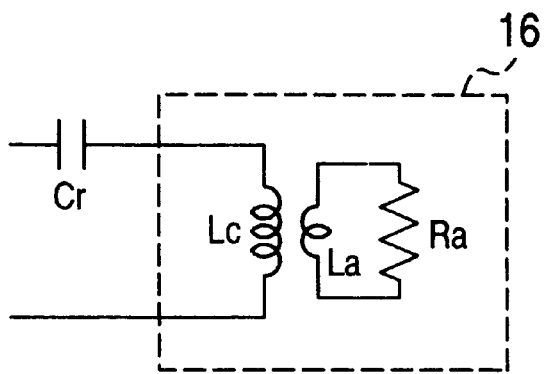
FIG. 11 is a view showing an equivalent circuit of an electrodeless lamp.

The resonant load circuit included in the lighting circuit is a current resonant type provided with the resonant inductor Lr and the capacitor Cr. If the discharge tube 16 is an electrodeless lamp, the discharge tube 16 operates to supply high-frequency current of several MHz to an exciting coil. It means that the inductor Lr used in the MHz-level high-frequency circuit becomes costly. The exciting coil takes a structure where a solenoid-type winding is wound around a magnetic substance. The coil equivalently corresponds to the inductor. The lighting circuit arranged to be usable as the exciting coil and the resonant inductor of the electrodeless lamp is illustrated in FIG. 10. The discharge tube 16 is an electrodeless lamp having a winding wound around the magnetic substance. In FIG. 10, Lc denotes an equivalent inductor of the winding. The electrodeless lamp may be arranged to replace the winding of the exciting coil and the plasma generated inside of the discharge tube with a transformer shown in FIG. 11 as described in IEEE Transactions on Power Electronics Vol. 12, No.3, pp.507 to 516, 1997. In FIG. 11, the primary winding of the transformer corresponds to the winding of the exciting coil and the secondary winding corresponds to the plasma, in which the inductor is La and the equivalent resistor is Ra.

Figure 12:
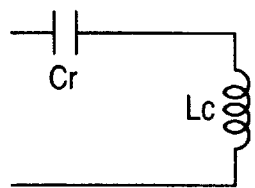
FIG. 12 is a view showing an equivalent circuit of an electrodeless lamp before lighting.
Figure 13:
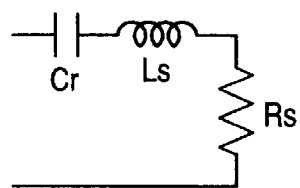
FIG. 13 is a view showing an equivalent circuit of an electrodeless lamp after lighting.
Figure 14:
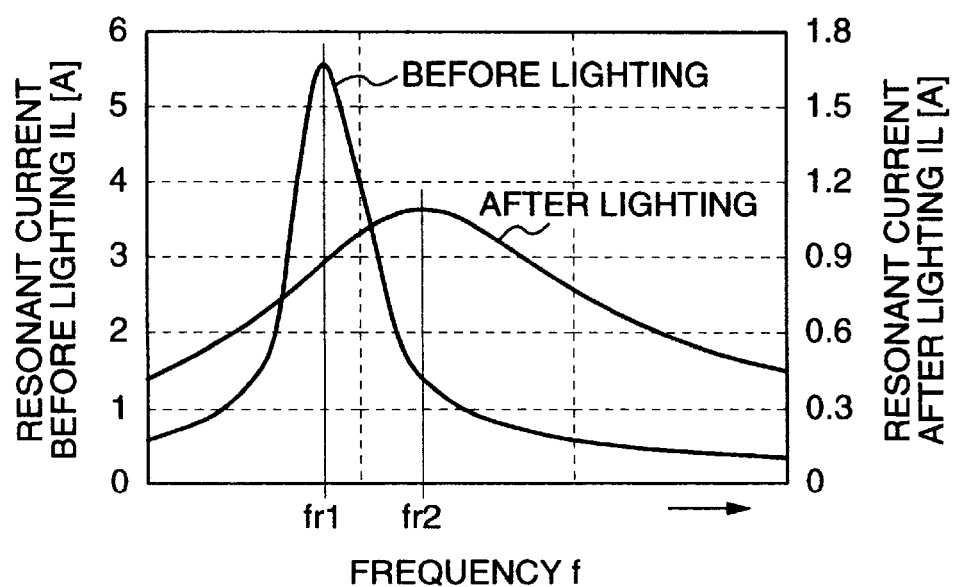
FIG. 14 is a graph showing relation between frequency and resonant current.

As described above, the equivalent circuit of the transformer-coupled electrodeless lamp is changed before and after the lighting circuit is operated. FIG. 12 shows the equivalent circuit before lighting. Since no plasma is generated inside of the discharge tube, the inductor Lc is a pure inductor composed of a coil wound around the magnetic substance. On the other hand, after lighting, since the generated plasma provides the equivalent inductance and resistance, the equivalent circuit is changed so that the circuit is connected in series to the inductor Ls and the resistor Rs as shown in FIG. 13. The equivalent inductor La of the plasma makes the inductor Ls take a different value from the inductor shown in FIG. 12 Hence, the resonant frequency of the resonant load circuit before lighting is different from that after lighting. FIG. 14 shows a resonance curve of the resonant load circuit. As will be understood from FIG. 14, the equivalent inductance of the exciting coil after lighting is smaller than that before lighting. Hence, the resonant frequency fr2 after lighting becomes higher than the resonant frequency fr1 before lighting.

The lighting circuit arranged to be usable as the exciting coil and the resonant inductor of the electrode lamp provides the equivalent inductance of the exciting coil to be varied according to the lighting state of the lamp as mentioned above. Hence, as compared with the provision of the resonant inductor Lr, the great change of the resonant frequency of the resonant load circuit takes place. It means that the lighting circuit has to keep self-exciting in synchronous to the variation of the load.

Figure 15:
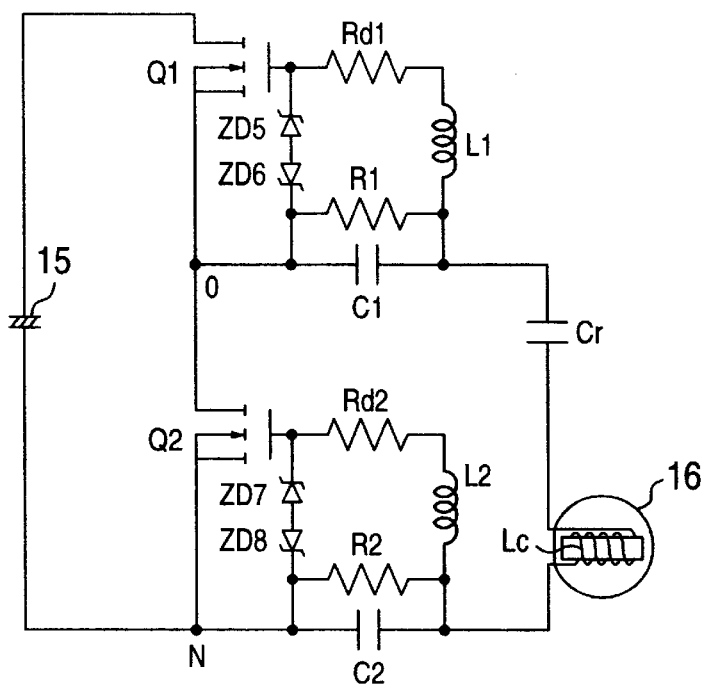
FIG. 15 is a view showing a lighting circuit according to a third embodiment of the present invention.
Figure 16:
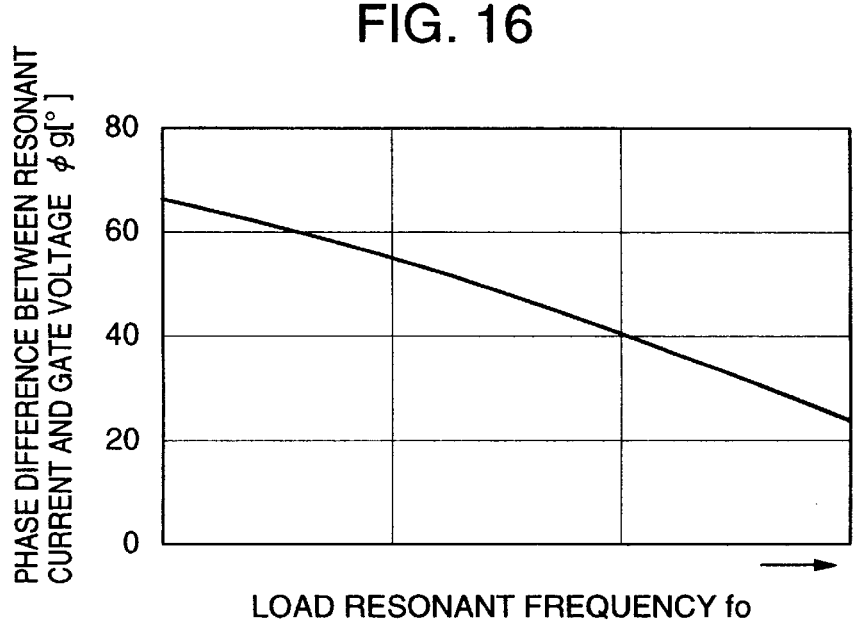
FIG. 16 is a graph showing relation between a resonant load frequency and a phase difference between resonant current and a gate voltage.

FIG. 15 shows a lighting circuit arranged to be usable as the exciting coil and the resonant inductor of the electrodeless lamp. In FIG. 15, between the contact O and the N point are series-connected voltage drop means C1, C2, a resonant capacitor Cr, and an exciting coil and resonant inductor Lc of a discharge tube 16. The switching elements Q1 and Q2 have their gate circuits arranged similarly with the foregoing circuit shown in FIG. 3 and their equivalent circuits arranged similarly with that shown in FIG. 5. Next, the self-exciting drive will be described in synchronous to the variation of the load. FIG. 16 shows a phase difference φg between the resonant current and the gate voltage in the case of changing the resonant frequency of the resonant load circuit. As will be understood from FIG. 16, as the resonant frequency is higher, the phase difference φg is made smaller. This is because if the series circuit composed of Ciss, Rd1 and L1 has a capacitive impedance Zg, the increase of the frequency makes Zg come closer to an inductive characteristic. This makes the current flowing through the series circuit delayed and the gate voltage for the voltage of Ciss delayed. Hence, the phase difference φg of the gate voltage for the resonant load current is made smaller. For the change of the resonant frequency caused by the load variation, the gate circuit operates to automatically adjust the phase difference between the resonant current and the gate voltage and keep the self-exciting drive. That is, provision of the phase shift means in the gate circuit makes it possible to:

1) optionally adjust the on and off timing of Q1 and Q2, thereby being able to change the operating frequency, and 2) follow the resonant condition if it is changed by the variation of the load.

Figure 17:
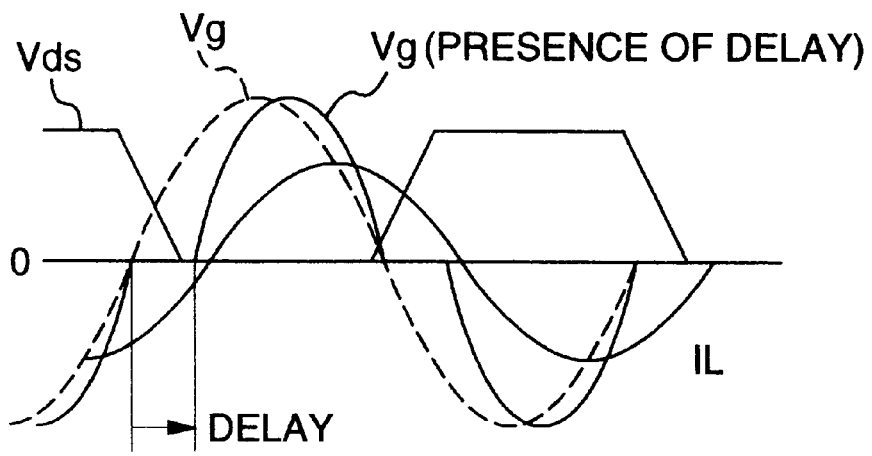
FIG. 17 is a graph showing waveforms of a drain voltage Vds, a gate voltage Vg and a resonant current IL of a gate circuit.

In this system, when both of the gate voltages of the switching elements Q1 and Q2 come closer to the threshold voltage values of Q1 and Q2, respectively, the shortcircuit may take place between these elements. Or, when Q1 and Q2 are turned on, if the gate voltage is turned on before the voltage between the drains and the sources of Q1 and Q2 are completely lowered to zero potential, Q1 and Q2 may be heated. FIG. 17 illustrates the latter phenomenon by using the waveforms of a voltage Vds between the drain and the source, a gate voltage Vg and a resonant current Il of the high-side gate circuit. As will be understood from FIG. 17, if the gate voltage Vg may take a waveform shown by a broken line, the element is heated as stated above. On the other hand, if the gate voltage Vg is changed to have a waveform indicated by a real line by delaying the turn-on of the gate voltage Vg, it is possible to prevent the elements from being heated. When Q1 and Q2 are turned on, by providing the waveform of the gate voltage with the delay time, it is possible to suppress the shortcircuit between the switching elements and heating.

Figure 18:
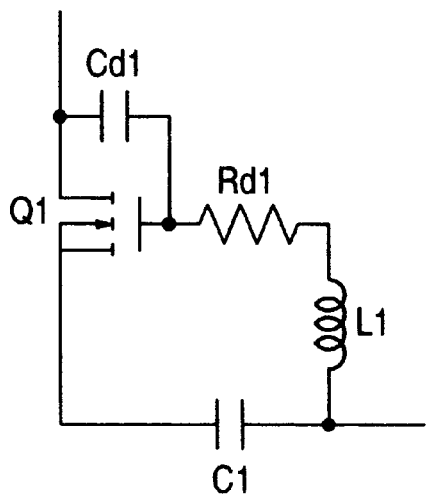
FIG. 18 is a view showing a first embodiment of a gate circuit.

FIG. 18 shows a gate circuit on the high side in which a gate voltage is provided with a delay period. The gate circuit on the low side has the same arrangement as the gate circuit on the high side. Hence, the figure of the high-side gate circuit is left out. In FIG. 18, the voltage drop means is a capacitor and the phase shift means is a series connection of an inductor and a resistor. The arrangement so far is the same as that shown in FIG. 15. However, a capacitor Cd1 is provided between the gate terminal and the drain terminal of Q1. In turn, the operation will be described.

When Q2 is turned off, the resonant current is circulated in a diode QD1 of Q1 for reducing the voltage Vds between the drain and the source of Q1. In the case of flowing current to be charged into the capacitance between the gate and the source, the gate current bypasses the capacitor Cd1, which serves to suppress the rise of the gate voltage so that the delay period is provided.

Figure 19:
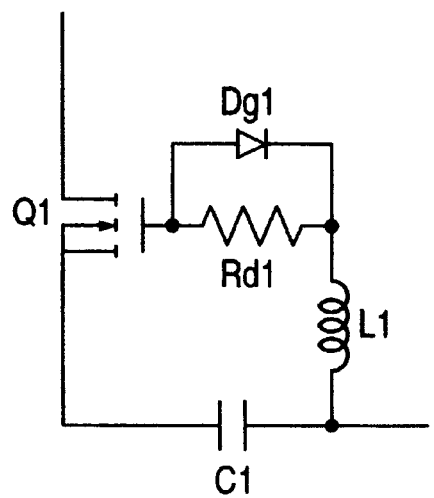
FIG. 19 is a view showing a second embodiment of a gate circuit.

As shown in FIG. 18, FIG. 19 shows the gate circuit on the high side in which the gate voltage is provided with the delay period. In FIG. 19, the voltage drop means and the phase shift means are the same as those shown in FIG. 15 but the diode Dg1 is connected in parallel to the resistor Rd1. Dg1 is directed so that the anode terminal is connected to the gate terminal of Q1 and the cathode terminal is connected to a contact between the resistor Rd1 and L1. The diode Dg1 may be connected in parallel to L1. In this case, Dg1 is directed so that the anode terminal is connected to a contact between the resistor Rd1 and L1 and the cathode terminal is connected to a contact between L1 and C1. In FIG. 19, if the capacitance between the gate and the source is charged, the gate current is flown through the phase shift means L1 and Rd1 in sequence. On the other hand, if the charges in the capacitance between the gate and the source are discharged, the current is flown through the diode Dg1 and L1 in sequence. Thus, by changing the passage of the current discharged from the capacitance between the gate and the source, that is, by switching the impedance of the gate circuit, the delay may be provided when reversing the polarity of the gate voltage.

Figure 20:
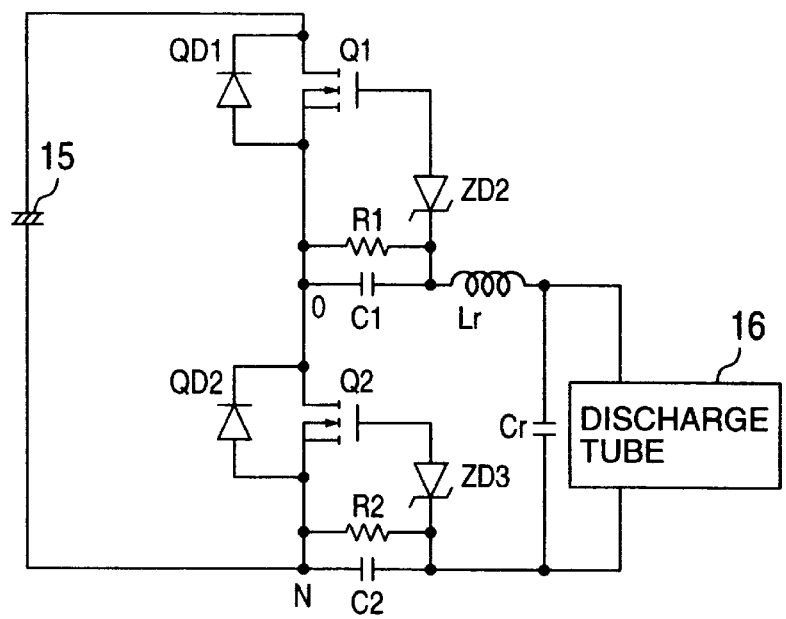
FIG. 20 is a view showing a lighting circuit according to a fourth embodiment of the present invention.

The lighting circuit shown in FIG. 20 provides a Zener diode ZD2 between the gate terminal of Q1 and one end of the capacitor C1 and a Zener diode ZD3 between the gate diode of Q2 and one end of the capacitor C2 and secures a dead time interval when the vertically located switching elements are turned on and off. For this type of gate circuit, the phase difference between the resonant current and the gate voltage is fixed. Hence, it is desirable to provide the resonant load circuit with the resonant inductor Lr so that the resonant frequency is made constant for the load variation. In FIG. 20, the voltage to be applied between the gate and the source of Q1 is made to be a difference voltage between the voltage Vc1 of the capacitor C1 and the Zener voltage of ZD2. Likewise, the voltage to be applied between the gate and the source of Q2 is made to be a difference voltage between the voltage Vc2 and the Zener voltage of ZD3. Hence, when any one of the switching elements Q1 and Q2 is on, it is necessary to lower the gate voltage of the other switching element that is off by the Zener voltage of the Zener diode connected to the gate terminal of the switching element, for inserting a dead time between when Q1 is on and when Q2 is off.

Figure 21:
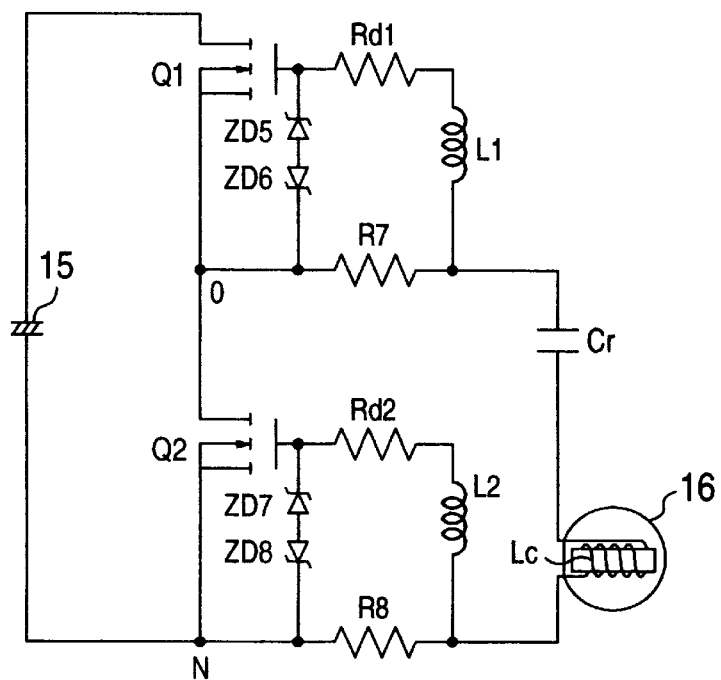
FIG. 21 is a view showing a lighting circuit according to a fifth embodiment of the present invention.

The aforementioned embodiment is arranged to use the capacitors C1 and C2 for the voltage drop means Z1 and Z2. In place, the voltage drop means Z1 or Z2 may be an inductor, a resistor or a combination of them. FIG. 21 shows a lighting circuit arranged to use resistors R7 and R8 for the voltage drop means Z1 and Z2. In the case of connecting the resonant load circuit in series to the resistor, the maximum of the current flowing through the circuit is made smaller. Hence, it is desirable to set the resistance to a small value. The phase shift means L1 or Rd1 has the same arrangement as that shown in FIG. 15 but an input capacitance Ciss of Q1 and a synthetic impedance of L1 and Rd1 are different from those of FIG. 15.

Figure 22:
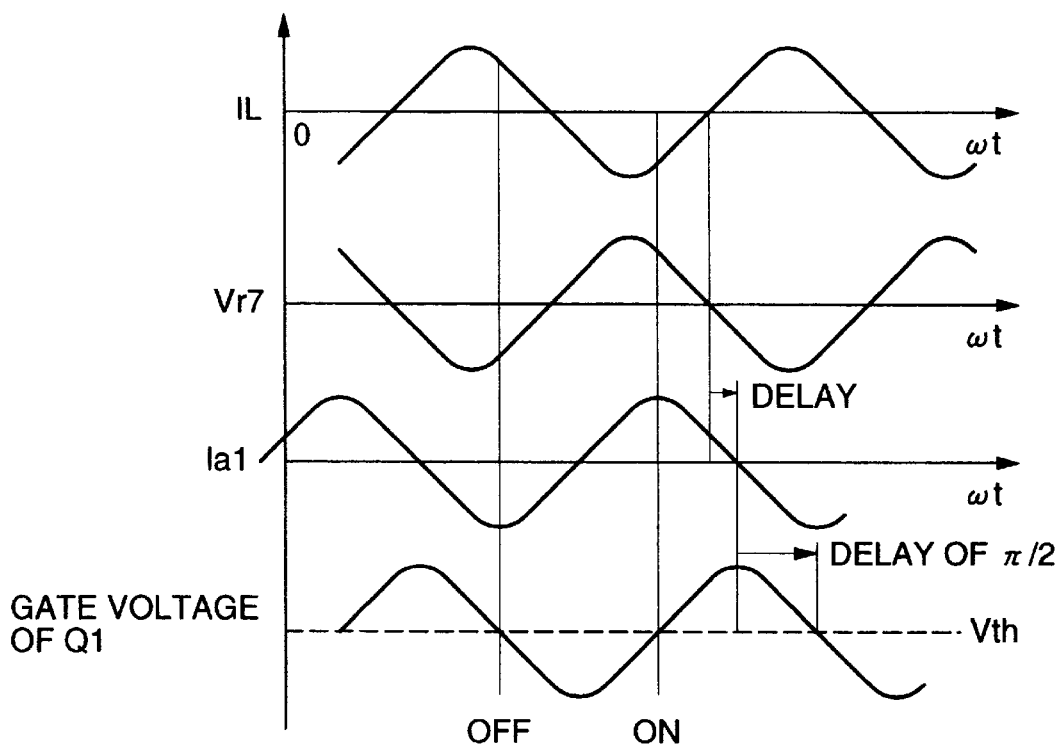
FIG. 22 is an explanatory view showing an operation of the embodiment shown in FIG. 21.

In turn, the description will be oriented to the operation of the circuit shown in FIG. 21 with reference to FIG. 22. FIG. 22 shows a waveform of each part of the gate circuit on the high side in the embodiment shown in FIG. 21. In FIG. 22, the current IL flowing through the resonant load circuit causes the resistor R7 to generate the voltage Vr7 that is opposite in phase to IL with the O point as a reference level. If the input capacitance Ciss of Q1 and the synthetic impedance of L1 and Rd1 are made inductive, the current IG1 flowing through the phase shift means L1 and Rd1 is made to have a waveform of a delay phase rather than Vr7. The voltage to be applied between the gate and the source of q1 is made to have a waveform whose phase is delayed by $\pi/2$ [rad] rather than Ig1. On the other hand, for the gate circuit on the low side, the voltage of the resistor R8 is in phase with the resonant current IL. Hence, the low-side gate circuit operates in a reverse manner to the high-side gate circuit.

Figure 23:
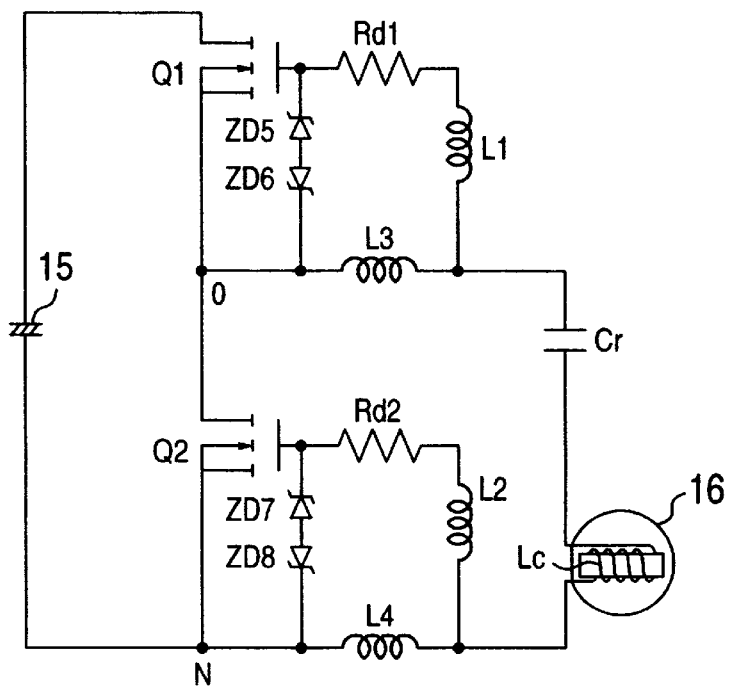
FIG. 23 is a view showing a lighting circuit according to a sixth embodiment of the present invention.

FIG. 23 is a lighting circuit arranged to use inductors L3 and L4 as voltage drop means Z1 and Z2. In a case of connecting the inductors in series to the resonant load circuit, the resonant frequency of the load circuit is determined by a synthetic inductance containing the voltage drop means L3 and L4. The phase shift means L1 and Rd1 are likewise to those shown in FIG. 15. However, the synthetic impedance of Ciss, L1 and Rd1 of Q1 is different from that shown in FIG. 15.

Figure 24:
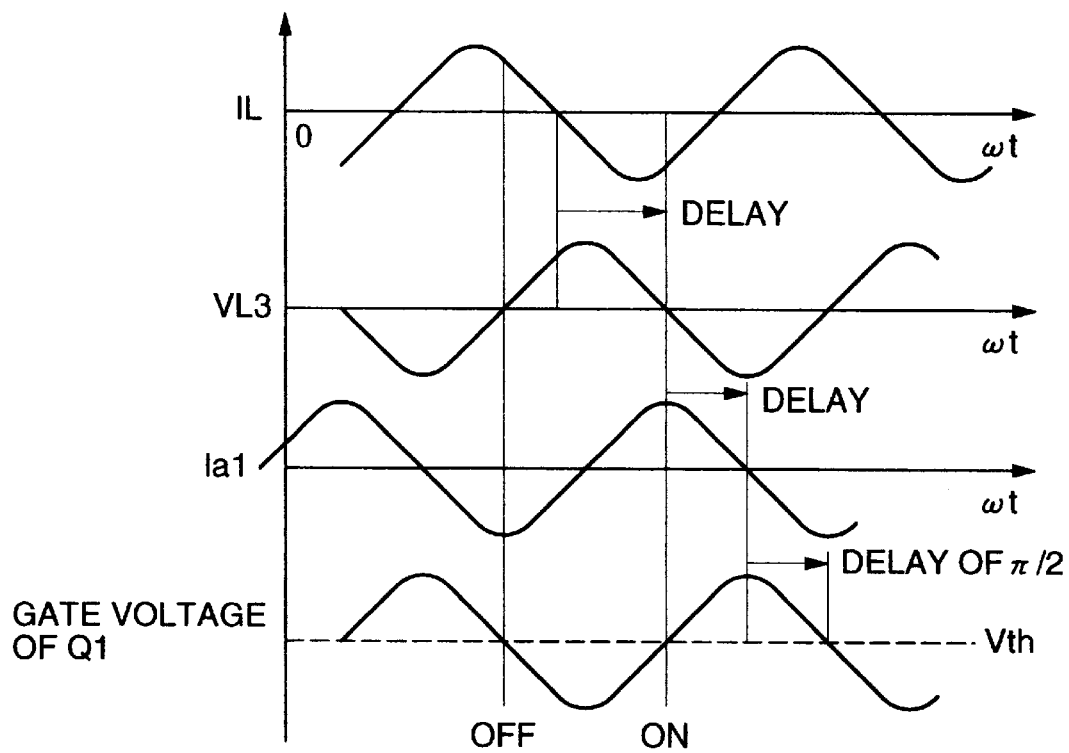
FIG. 24 is an explanatory view showing an operation of the embodiment shown in FIG. 22.

In turn, the operation of the circuit shown in FIG. 23 will be described with reference to FIG. 24. FIG. 24 represents the waveform of each part of the gate circuit on the high side included in the embodiment shonw in FIG. 23. In FIG. 24, when the current IL is flown in the resonant load circuit, the voltage VL3 of the inductor L3 generated with an O point as a reference level is made to have a waveform of a lagged phase rather than IL. The current Ig1 flowing the phase shift means L1 and Rd1 is made to have a waveform of a lagged phase rather than VL3 if a synthetic impedance of the gate circuit composed of Ciss, Le and Rd1 of Q1 is inductive. The voltage to be applied between the gate and the source of Q1 is made to have a waveform of a lagged phase rather than Ig1 by $\pi/2$ [rad]. On the other hand, in the gate circuit on the low side, the voltage of the resistor R8 has the same phase as the resonant current Il. Hence, the gate circuit on the low side performs in a reverse manner to the gate circuit on the high side.

Figure 25:
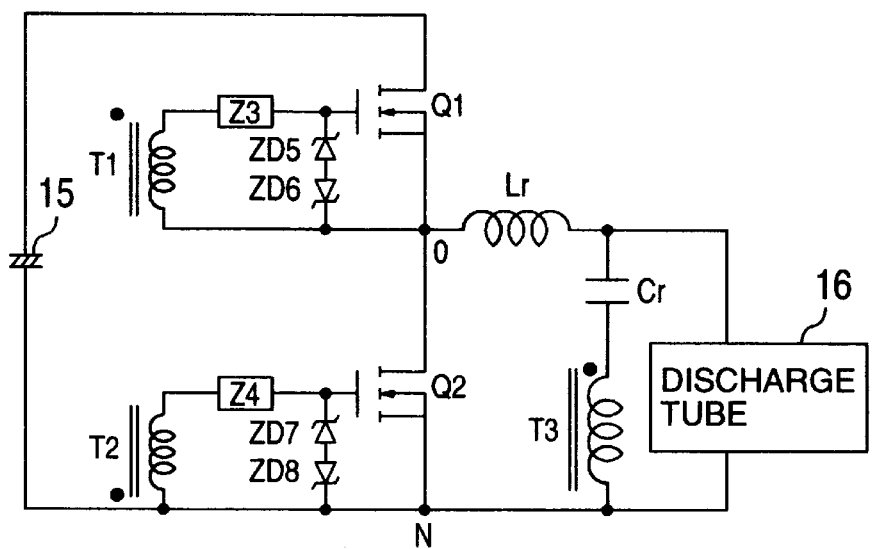
FIG. 25 is a view showing a lighting circuit according to a seventh embodiment of the present invention.

FIG. 25 shows the embodiment arranged to apply the present invention to the conventional lighting circuit disclosed in JP-A-8-45685. In FIG. 25, a pair of switching elements Q1 and Q2 connected in series are connected between a positive and a negative electrodes of the voltage source 15. A resonant inductor Lr, a resonant capacitor Cr, and a winding T3 are connected in series between a contact O of those switching elements and a contact N between Q2 and the negative electrode of the voltage source 15.

A discharge tube 16 is provided as load in parallel to Cr and T3. The winding T1 or T2 is connected through the phase shift means Z3 or Z4 between the gate and the source of Q1 or Q2. The Zener diodes coupled in series and in opposite to each other are provided in parallel to Q1. The winding T1 has an opposite polarity to the winding T2. The windings T1 and T2 are magnetically coupled to a winding T3. The winding T3 operates to sense the current flowing through the resonant load circuit and feed back the current to the windings T1 and T2 for doing the switching operation of Q1 and Q2. The phase shift means Z3 or Z4 connected to the gate terminal of Q1 or Q2 provides impedance of a capacitor, an inductor, a resistor or a combination of them. By selecting the magnitude of the impedance, the on and off timing of Q1 and Q2 is optionally adjusted for changing the operating frequency. For providing a dead time between an on and an off of the vertically located switching elements, it is desirable to arrange the foregoing gate circuit as shown in FIG. 18, FIG. 19 or FIG. 20.

Figure 26:
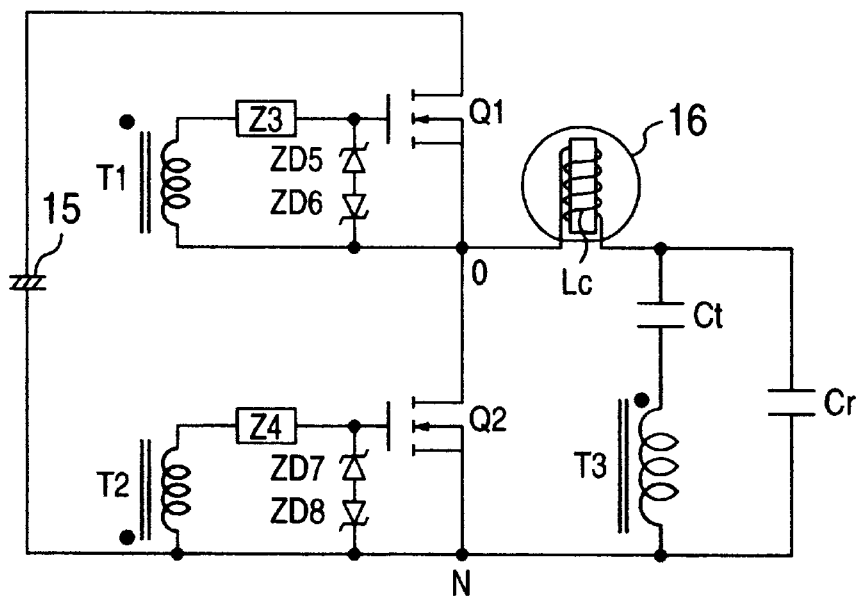
FIG. 26 is a view showing a lighting circuit according to an eighth embodiment of the present invention.

FIG. 26 shows an embodiment in which the present invention is applied to the lighting circuit arranged to be usable as the exciting coil and the resonant inductor of the electrodeless lamp. In FIG. 26, a resonant capacitor Cr and an exciting coil and resonant inductor Lc of the discharge tube 16 are connected in series between the contacts O and N. A capacitor Ct and a winding T3 connected in series are provided between both ends of Cr. The gate circuit of Q1 or Q2 has the same arrangement as shown in FIG. 25. Hence, the description about the gate circuit is left out. In the resonant load circuit shown in FIG. 26, as mentioned above, the equivalent inductance of the exciting coil is changed according to the lighting state of the lamp. Hence, as compared with the provision of the resonant inductor Lr, the resonant frequency of the resonant load circuit is greatly changed. That is, if the load variation varies the resonant condition, the phase shift means Z3 or Z4 connected to the gate terminal serves to change the impedance for continuing the self-exciting drive.

Figure 27:
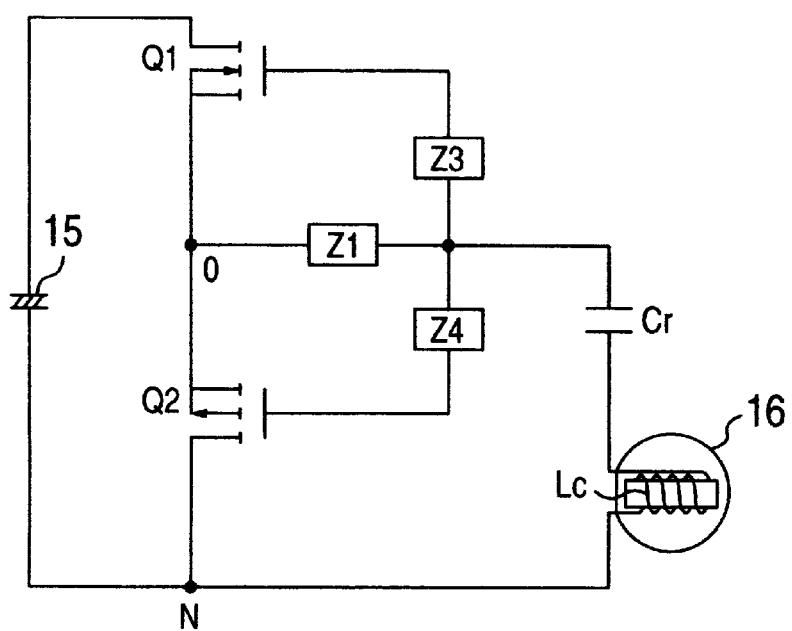
FIG. 27 is a fourth schematic view showing a lighting circuit according to the present invention.

FIG. 27 shows an embodiment in which the lighting circuit arranged to be usable as the exciting coil and the resonant inductor of the electrodeless lamp provides an N-channel switching element on the high side and a P-channel switching element on the low side. Between the contacts O and N are series-connected voltage drop means Z1, a resonant capacitor Cr, and an exciting coil and resonant inductor Lc of the discharge tube 16. Phase shift means Z3 is connected between one end of the voltage drop means Z1 and the gate terminal of Q1. Phase shift means Z4 is connected between one end of the voltage drop means Z1 and the gate terminal of Q2. The voltage of Z1 is applied to the gate terminals of Q1 and Q2 through Z3 and Z4. In the case of applying an excessive voltage between the gate and the source of Q1 or Q2, for preventing breakage of the switching element, it is possible to provide a Zener diode connected in series and in opposite to Q1 or Q2. As mentioned above, by providing the low side with the P-channel switching element and making the lighting circuit complementary type, the voltage drop means connected to the resonant load circuit may be commonly used as the gate circuits of the vertical switching elements. As compared with the low side composed of the N-channel switching element, the number of parts is reduced in the low side of the P-channel switching element, which is effective in lowering the cost. In the case of providing two voltage drop means Z1 and Z2 in the resonant load circuit, it is considered that the variation of the parts may keep the vertical switching operation out of balance. By reducing the number of the voltage drop means into one, it is possible to solve this problem. The resonant load circuit shown in FIG. 27 is arranged to be usable as both the exciting coil and the resonant inductor of the electrodeless lamp. In place, an additional resonant inductor may be provided to the resonant load circuit.

Figure 28:
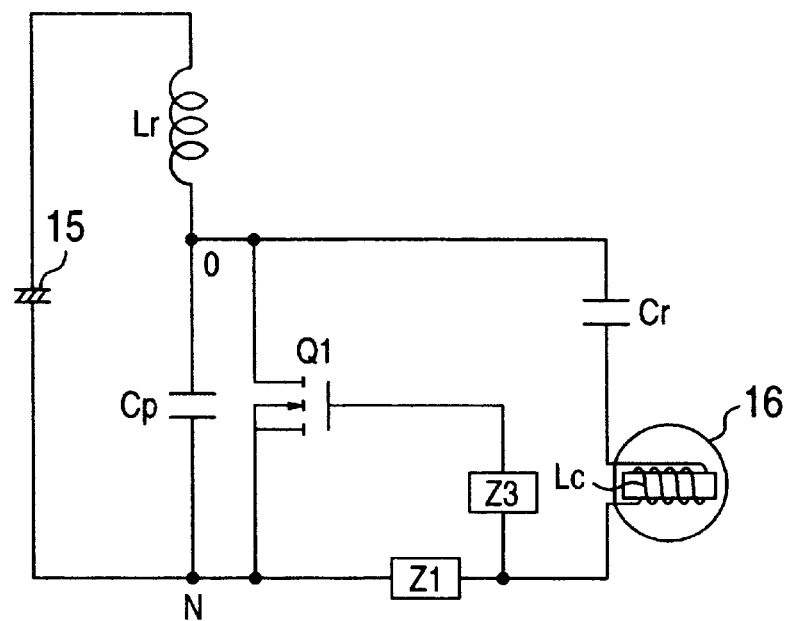
FIG. 28 is a fourth schematic view showing a lighting circuit according to the present invention.

The foregoing embodiment has concerned with the lighting circuit for supplying AC current to a current resonant type load circuit provided with the resonant inductor Lr and the capacitor Cr through the effect of the alternate switching operation of the pair of switching elements Q1 and Q2 connected in series. On the other hand, the lighting circuit for supplying an electric power to the resonant load circuit through the effect of one switching element is illustrated in FIG. 28. The lighting circuit shown in FIG. 28 is arranged to be usable as both the exciting coil and the resonant inductor of the electrodeless lamp. Between a positive electrode and a negative one of a voltage source 15 are provided an inductor Lr and a capacitor Cp connected in series. The switching Q1 is connected between both ends of the capacitor Cp. Letting O be a contact between Lr and Cp and N be a contact between Q2 and the negative electrode of the voltage source 15, the voltage drop means Z1, the resonant capacitor Cr, and the exciting coil and resonant inductor Lc of the discharge tube 16 are connected in series between the O and the N contacts. In FIG. 28, phase shift means Z3 is provided between a gate terminal of the switching element Q1 and the voltage drop means Z1. This phase shift means has a role of delaying or advancing a phase when applying the voltage of the voltage drop means between the gate and the source of Q1, for optionally adjusting the on and off timing of Q1. For the purpose of preventing breakage of the switching element caused by the application of an excessive voltage between the gate and the source of Q1, it is possible to provide a Zener diode connected in series and in opposite to Q1. In FIG. 28, the voltage drop means Z1 and the phase shift means Z3 may be a capacitor, an inductor, a resistor or a combination of them, for example. In a case that the resonant load circuit shown in FIG. 28 uses the resonant inductor, the voltage drop means Z1, the resonant inductor Lr, and the resonant capacitor Cr are connected in series between the O and the N points. The discharge tube 16 is provided in parallel to Cr.

Figure 29:
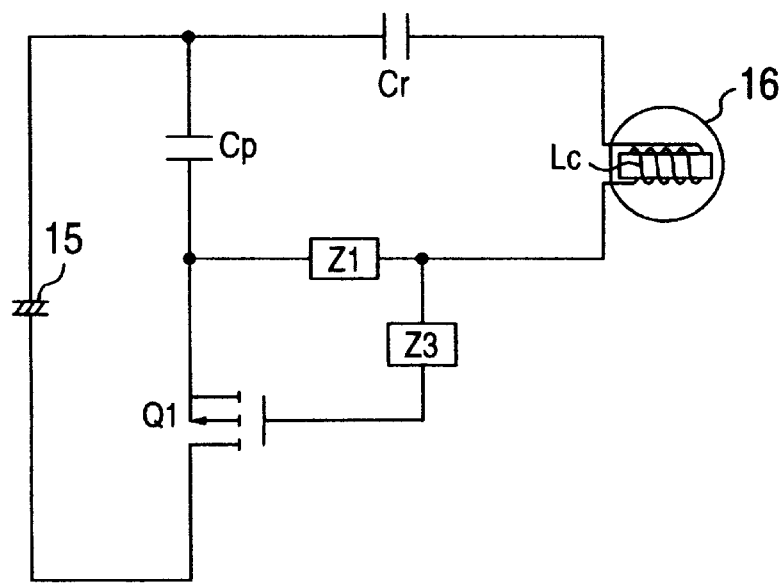
FIG. 29 is a sixth schematic view showing a lighting circuit according to the present invention.

FIG. 28 illustrates the lighting circuit arranged to use a single N-channel switching element, while FIG. 29 shows a lighting circuit arranged to use a P-channel switching element. In FIG. 29, a capacitor Cp and a switching element Q1 connected in series are provided between a positive electrode and a negative one of a voltage source 15. Between both ends of Cp are series-connected the voltage drop means Z1, a resonant capacitor Cr, and an exciting coil and resonant inductor Lc of the discharge tube 16. The phase shift means Z3 is provided between the gate terminal of the switching element Q1 and the voltage drop means Z1. Further, a Zener diode may be provided in series and in opposite between the gate and the source of Q1. In a case that the resonant load circuit shown in FIG. 29 uses the resonant inductor, the voltage drop means Z1, the resonant inductor Lr, and the resonant capacitor Cr are connected in series between both ends of Cp. The discharge tube 16 is provided in parallel t Cr.

The aforementioned embodiment has been arranged to connect the voltage drop means in series to the resonant load circuit and drive the switching element in response to the voltage caused by the resonant current. On the other hand, the following description will be oriented to an embodiment in which the switching elements and the built-in diodes are driven by the voltage caused by the resonant current only when they are on.

Figure 30:
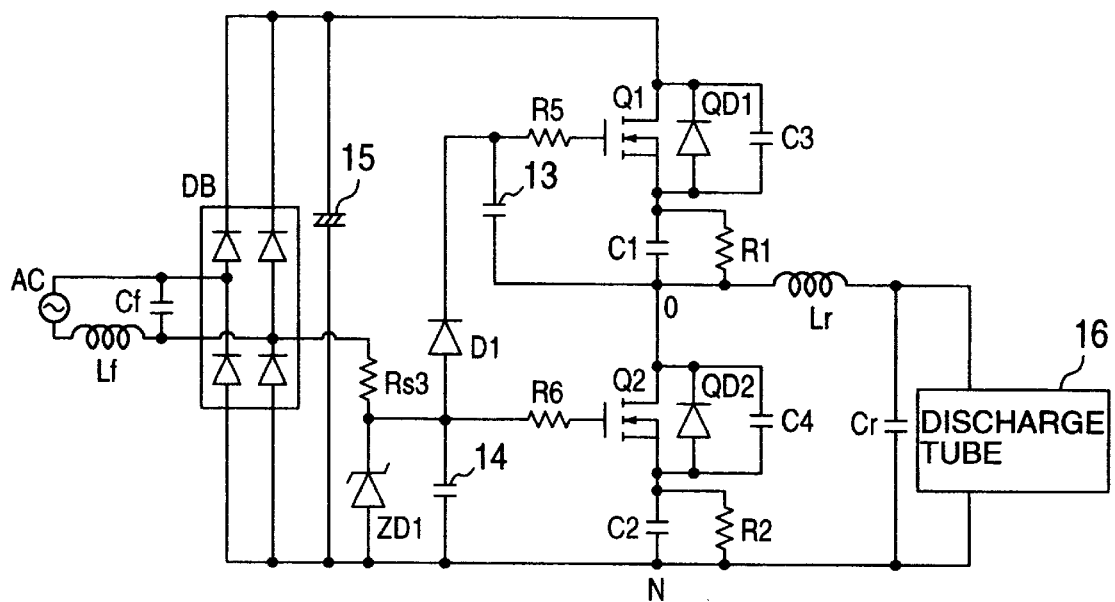
FIG. 30 is a view showing a lighting circuit according to a ninth embodiment of the present invention.

In the embodiment shown in FIG. 30, an AC power source AC supplies AC current to a rectifying circuit composed of a diode bridge DB through an AC filter composed of inductors Lf and Cf. The rectified current is sent to a voltage source 15. The voltage source 15 operates to generate a DC voltage from the rectified current. A drain terminal of Q1 is connected to a positive electrode of the voltage source. A capacitor C1 is connected as voltage drop means between a source terminal of Q1 and a drain terminal of Q2. The contact between C1 and Q2 is denoted by O. The capacitor C1 is connected in parallel to a resistor R1. Further, a capacitor C2 is connected between a source terminal of Q2 and a negative electrode of the voltage source 15. The contact between Q2 and the negative electrode of the voltage source 15 is denoted by N. Like C1, the capacitor C2 is connected in parallel to a resistor R2. Between the contacts O and N are series-connected a resonant inductor and a resonant capacitor Cr. Cr provides a discharge tube 16 in parallel thereto. If the discharge tube is an electrodeless lamp, Lr shown in FIG. 30 may be usable as the exciting coil and the resonant inductor.

A capacitor C3 is connected in parallel between the drain terminal and the source terminal of Q1. A gate resistor R5 and a capacitor 13 are connected in series between the gate terminal and the output O. Like Q1, a capacitor C4 is also connected in parallel between the drain terminal and the source terminal of Q2. A gate resistor R6 and a capacitor 14 are connected in series between the gate terminal and the contact N. The capacitor 14 is connected in parallel to a Zener diode ZD1. Further, a resistor Rs3 is connected to a contact between the inductors Lf and Cf connected in series to the cathode of the diode ZD1. Herein, the voltage of the capacitor 14 serves to drive Q2 so that the Zener voltage of the diode ZD1 may be kept irrespective of the magnitude of the AC voltage. Further, the voltage of the capacitor 13 serves to drive Q1. The capacitor 13 is discharged by the voltage of the capacitor C14. With Q2 being turned on, the voltage of the capacitor C14 with the N point as a reference level is supplied to the capacitor 13 through the diode D1.

Figure 31:
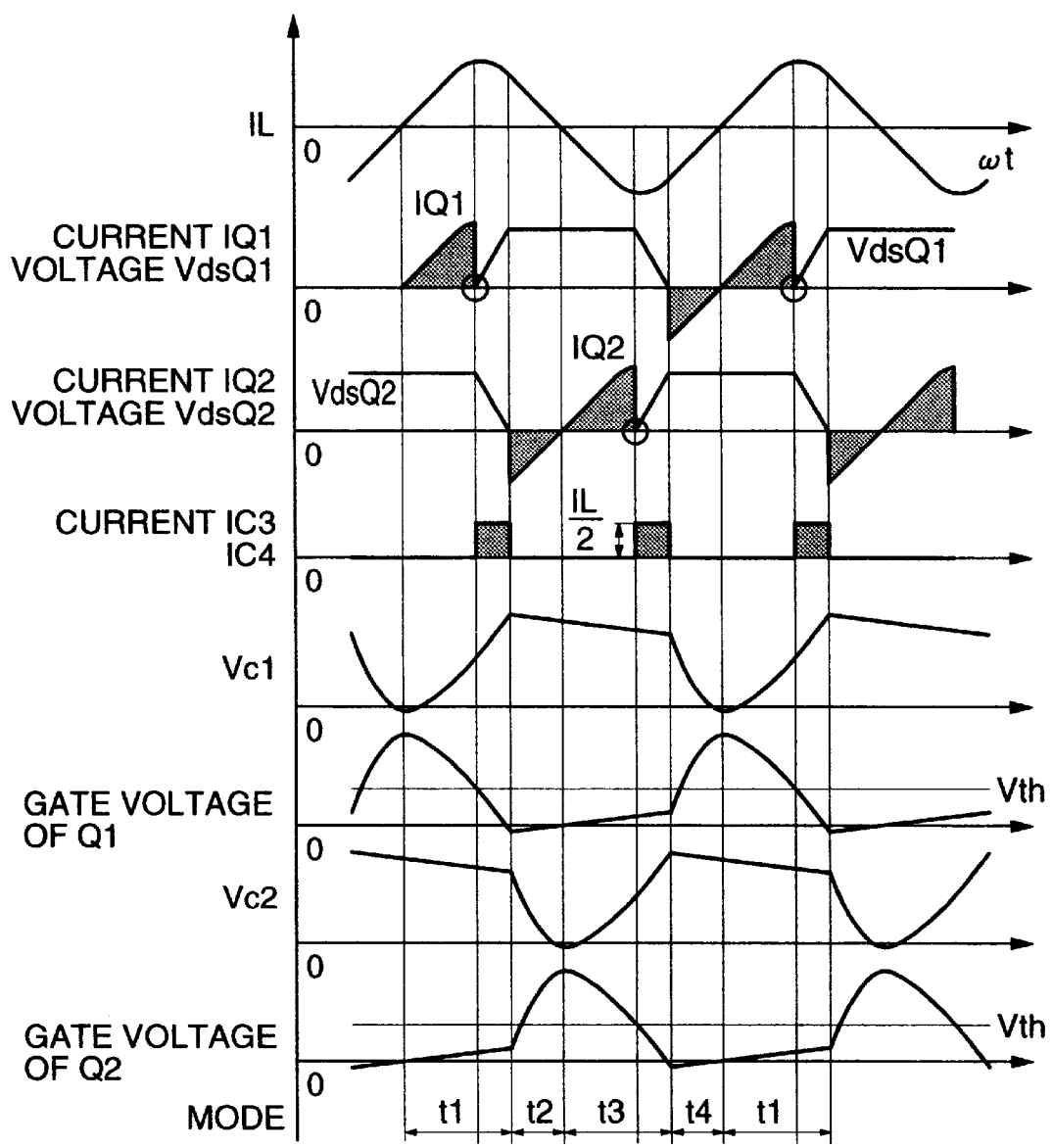
FIG. 31 is an explanatory view showing an operation of the embodiment shown in FIG. 30.

In turn, the description will be oriented to the operation of this circuit with reference to FIG. 31. FIG. 31 shows a waveform of each part included in the embodiment shown in FIG. 30. The current IL of a resonant circuit is defined assuming that the flowing direction of the current IL of the resonant circuit from the O point shown in FIG. 30 is positive. In this definition, during one period of the current IL, four operation modes are provided about Q1, A2, QD1 and QD2. These periods of the modes are indicated as t1 to t4. Hereafter, each operation mode will be described.

Mode 1 (t1 period): When Q1 is turned on, the voltage source 15 operates to flow the current IL through a passage of Q1, C1, Lr and Cr. The current IL is charged in Cr and also is partially branched into the discharge tube 16. Further, the capacitor C1 is charged by the current IL. The voltage applied between the gate and the source of Q1 at the mode 1 corresponds to a difference voltage between the voltage of the capacitor 13 and Vc1. With increase of Vc1, the gate voltage of Q1 is decreased. When the gate voltage is equal to or lower than a threshold voltage of MOSFET, Q1 is turned off.

During this period, the capacitor C2 is discharged through the effect of the resistor R2. The voltage Vc2 of C2 is gradually decreased as shown in FIG. 31.

Q1 has a capacitor C3 located in parallel thereto and Q2 also has a capacitor C4 located in parallel thereto. When Q1 is turned off, as shown in FIG. 9, the current IL/2 is caused to flow through C3 and a voltage rise dV/dt between the drain and the source of Q1 is limited by IL/2C3. At a time, the flow of the current IL/2 is caused to discharge C4 and dV/dt at the voltage drop of Q2 is similarly limited by Il/2C4. At the switching time, dV/dt may cause conduction noises and radiation noises. Like this embodiment, however, by doing the soft switching for suppressing dV/dt, it is possible to lighten this problem. Further, a current waveform of Q1 appearing when the t1 period is terminated is denoted by a circle mark. At this time point, the voltage of Q1 is substantially zero. It means that no switching loss exists which loss might be caused if the current of Q1 is overlapped with the voltage thereof. The soft switching is effective in reducing the switching loss.

At the operation, the current charged in C3 is charged in C1 and the gate voltage of Q1 is further decreased, so that Q1 may be stably turned off. On the other hand, the current to be discharged from the capacitor C4 is conversely charged to C2 so that Vc2 is further reduced.

Mode 2 (t2 period): When Q1 is turned off, the current IL has a value of a positive polarity. This current is kept flowing through a passage of Lr, Cr, C2 and QD2. Part of the current IL is branched into the discharge tube 16.

The current IL serves to reversely charge C2 so that Vc2 is reduced. Like Q1, the voltage to be applied between the gate and the source of Q2 corresponds to a difference voltage between the voltage of the capacitor 14 and Vc2. With decrease of Vc2, the gate voltage of Q2 is increased. When the gate voltage is greater than or equal to a threshold voltage of MOSFE, Q2 is turned on. During the mode 2 period, the current polarity is opposite as viewed from Q2. As shown in FIG. 31, if the gate voltage is charged, the current is kept flowing through QD2 as long as the current polarity is constant. The period to the change of the polarity of the current IL to a negative one corresponds to the mode 2, during which the reverse charge of C2 is continued so that Vc2 may be reduced.

During the mode 2, the capacitor C1 is caused to be discharged by the resistor R1 so that Vc1 is progressively reduced.

Mode 3 (t3 period): When the polarity of the current IL is changed from a positive value to a negative value, the current IL is kept flowing through Q2 whose gate voltage is charged at the mode 2. That is, the current IL is flown as discharge current through a passage of Q2, C2, Cr and Lr. C2 is charged by the current IL. Vc2 is increased by IL. When the gate voltage is equal to or lower than the threshold voltage of MOSFET, Q2 is turned off. At the mode 3, like the mode 1, while the polarity of the current IL is negative, Q2 is turned off.

During the mode 3, the capacitor C1 is discharged by the resistor R1, so that Vc1 is progressively reduced.

When Q2 is turned off, like when Q1 is turned off, the capacitors C3 and C4 located in parallel to Q1 and Q2 cause the current IL/2 to flow through C4. Then, the voltage rise dV/dt between the drain and the source of Q2 is limited by IL/2C4. At a time, the flow of the current IL/2 causes C3 to be discharged. Like Q2, dV/dt at the voltage drop of Q1 is limited by IL/2C3. The current waveform of Q2 appearing when the t3 period is terminated is denoted by a circle mark. At this time point, the voltage of Q2 is made substantially zero. It means that no switching loss exists which loss might be caused if the current of Q2 is overlapped with the voltage thereof.

In the foregoing operation, the current charged in C4 serves to charge C2 and the gate voltage of Q2 is further reduced. Hence, Q2 may be stably turned off. The current charged in C3 is reversely charged in C1, so that Vc1 is decreased.

Mode 4 (t4 period): When Q2 is turned off, the current IL has a value of a negative polarity. The electromagnetic energy stored in Lr serves to keep the current IL flowing through a passage of Lr, C1, QD1, the voltage source 15, Cr and Lr. In addition, part of the current IL is branched to the discharge tube 16.

The current IL has an effect on reversely charging C1, thereby reducing Vc1 and increasing the gate voltage of Q1. When the gate voltage is higher than or equal to the threshold value of MOSFET, Q1 is turned on. During the mode 4 period, the current polarity is opposite as viewed from Q1. If the gate voltage is charged, the current is kept flowing through QD1 as long as the polarity of the current is constant. The period to the change of the polarity of the current IL to a positive polarity corresponds to the mode 4. During this period, the reverse charge of C1 is continued so that Vc1 is reduced. Further, during the period of mode 4, the capacitor C2 is discharged by the resistor R2 so that Vc2 is gradually decreased.

The resistors R1 and R2 connected in parallel to the capacitors C1 and C2 have an effect on applying a bias voltage onto a voltage of the capacitor. This has a role of lowering the gate voltage of MOSFET, thereby providing a dead time interval between an on state and an off state of the vertically located switches. Further, by decreasing the voltage of the capacitor while the switch is turned off, it is possible to adjust the on periods of the vertically located switches.

As set forth above, during one period of the current IL, the operations from the mode 1 to the mode 4 are executed. Later, these operations are repeated.

The present system is arranged to turn off Q1 and Q2 according to the capacitor voltages Vc1 and Vc2 and has a shortcoming of lowering a current performance as the gate voltages of Q1 and Q2 are decreased and come closer to zero. This means the increase of an on resistance. In particular, in a case that the driving frequency is about several tens kHz, it is desirable to apply a great gate voltage enough to inhibit the increase of the on resistances of Q1 and Q2 if the switching loss of Q1 and Q2 is greater than a constant loss. Hence, an embodiment for solving this kind of problem is shown in FIG. 32.

Figure 32:
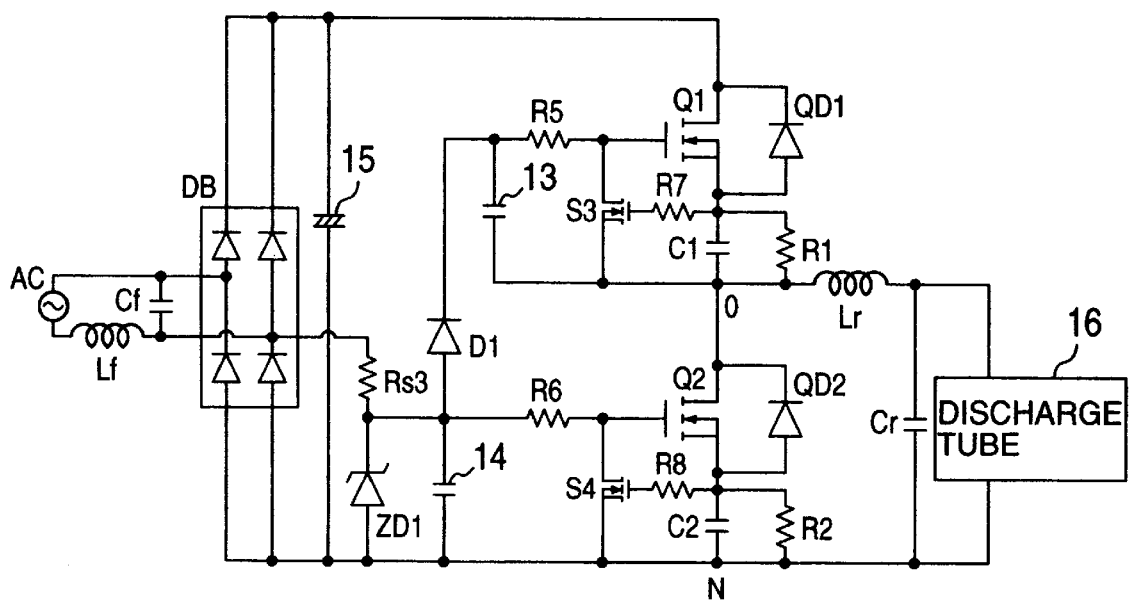
FIG. 32 is a view showing a lighting circuit according to a tenth embodiment of the present invention.

The arrangement of a resonant load circuit included in the embodiment shown in FIG. 32 is likewise to that included in the embodiment shown in FIG. 30. Hence, the description thereabout is left out. As will understood from FIG. 32, the gate terminal of Q1 is connected with the drain terminal of MOSFET S3 and a resistor R7 is connected between the source terminal of Q1 and the gate terminal of Q2. The source terminal of S3 is connected to a contact O. The arrangement of the driving circuit of Q2 is likewise to that of Q2. The gate terminal of Q2 is connected with the drain terminal of MOSFET S4 and a resistor R8 is connected between the source terminal of Q2 and the gate terminal of S4. The source terminal of S4 is connected with a contact N.

Figure 33:
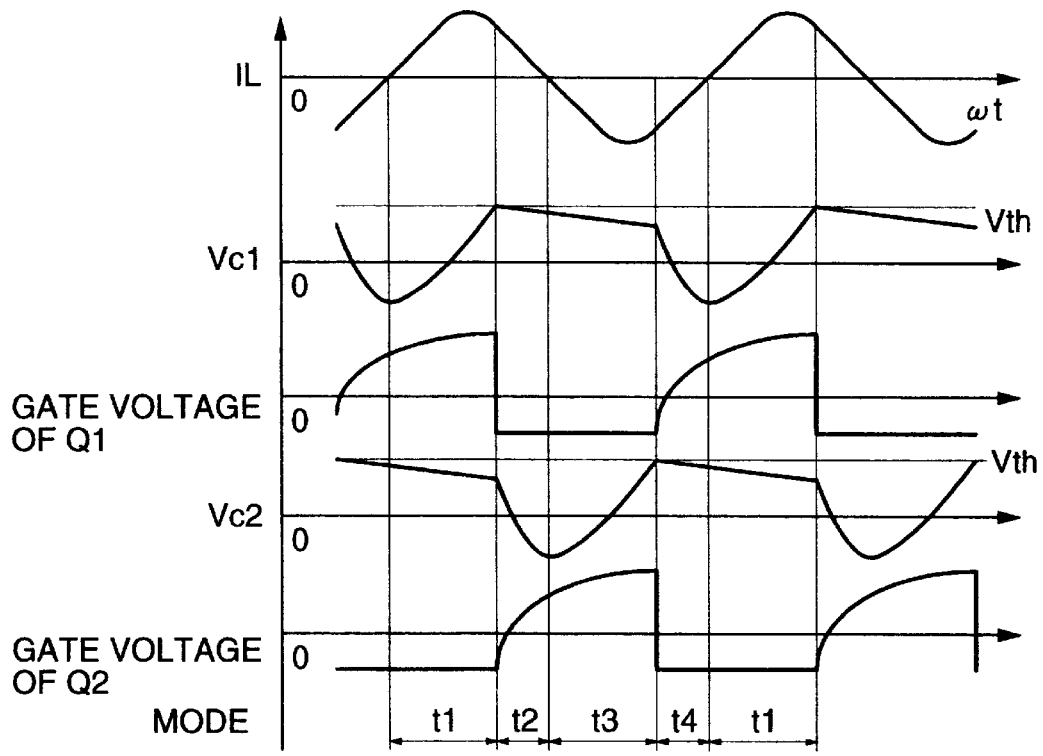
FIG. 33 is an explanatory view showing an operation of the embodiment shown in FIG. 32.

In turn, the operation of the embodiment shown in FIG. 32 will be described with reference to FIG. 33. FIG. 33 illustrates a waveform of each part of FIG. 32.

At first, when Q1 is turned on, the voltage source 15 operates to flow current IL through a passage of Q1, C1, Lr and Cr. The current IL is charged in the capacitor C1. When Vc1 exceeds a threshold voltage of MOSFET S3, S3 is turned on. This makes the gate voltage of Q1 discharged through S3 and C1 and the voltage Vc1 applied between the source and the gate in a reversely biased manner. This results in preventing Q1 from being minutely turned on again by the adverse factors such as noises, thereby being able to stably turn off Q1.

Next, when Q1 is turned off, the same operation as that of the mode 2 described with reference to FIGS. 30 and 31 is started. The description thereabout is likewise to the foregoing description. Hence, it is left out.

When the polarity of the current IL is changed from a positive polarity to a negative one, the current IL is caused to flow through Q2. That is, the current IL is flown as discharge current of Cr through a passage of Q2, C2, Cr and Lr and C2 is charged by IL. IL serves to increase Vc2. When Vc2 exceeds a threshold voltage of MOSFET S4, S4 is turned on. This makes the gate voltage of Q2 discharged through S4 and C2 and the voltage Vc2 applied between the source and the gate of Q2 in a reversely biased manner, thereby turning off Q2. This period corresponds to the mode 3.

When Q2 is turned off, the same operation as that of the mode described with reference to FIGS. 30 and 31 is started. The description of the operation of this period is likewise to the foregoing one. Hence, it is left out.

The foregoing operation is executed during one period of the current IL. After that, this operation is repeated.

Figure 34:
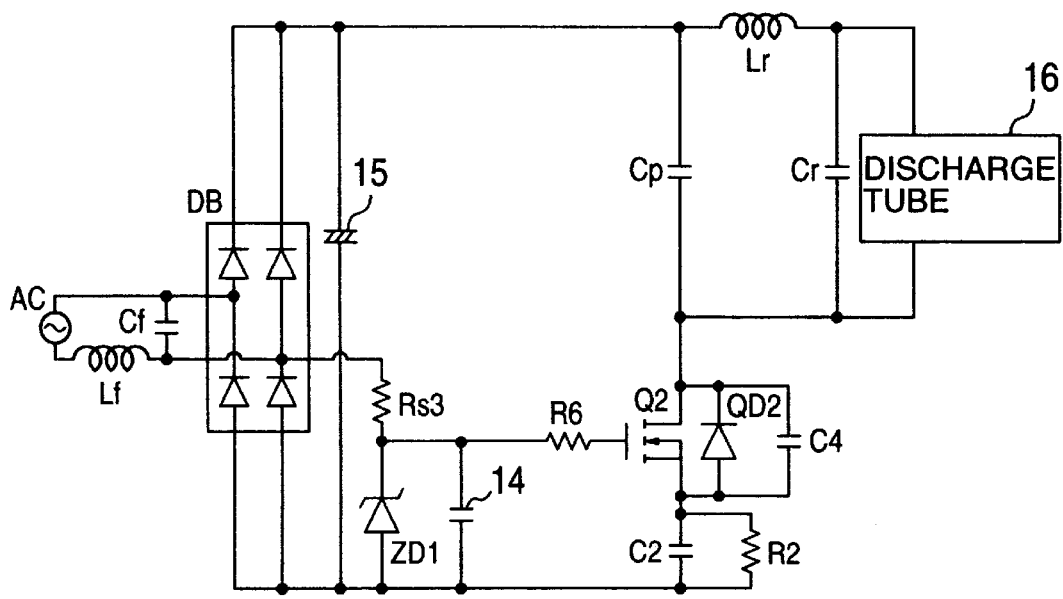
FIG. 34 is a view showing a lighting circuit according to an eleventh embodiment of the present invention.

In turn, a voltage resonance type lighting circuit arranged to use one switching element is illustrated in FIG. 34. As shown in FIG. 34, a resonant capacitor Cp is connected between a positive electrode of the voltage source 15 and a drain terminal of the switching element Q2. Further, between both ends of the capacitor Cp are series-connected a resonant inductor Lr and a resonant capacitor Cr. Cr provides a discharge tube 16 as a load in parallel thereto. A resonant load circuit is not limited to the arrangement shown in FIG. 34. Lr may be usable as the exciting coil and the resonant inductor of the electrodeless lamp. A capacitor C2 is connected between a source terminal of Q2 and a negative electrode of the voltage source 15. A resistor R2 is connected in parallel to C2. Further, the resistor R2 is connected in parallel to C2. Further, the capacitor C4 is connected between the drain and the source terminals of Q2. Letting the negative electrode of the voltage source 15 be an N point, a gate resistor R6 and a capacitor 14 are connected in series between the gate terminal and the N point, and a Zener diode ZD1 is connected in parallel to the capacitor 14. Further, a resistor Rs3 is connected between a cathode of the diode ZD1 and a contact between the inductors Lf and Cf connected in series to each other.

In turn, the description will be oriented to the operation shown in FIG. 34. At first, when Q2 is turned on, the voltage source 15 is caused to flow the current IL through Lr, Cr, Q2, and C2 so that the capacitor C2 is charged. During this period, the voltage to be applied between the gate and the source corresponds to a difference voltage between the voltage of the capacitor 14 and Vc2. With increase of Vc2, the gate voltage of Q2 is decreased. When the gate voltage is lower than or equal to the threshold voltage of MOSFET, Q2 is turned off. During this period, the voltage of the capacitor Cp corresponds to the voltage of the voltage source 15.

When Q2 is turned off, C4 located in parallel to Q2 serves to branch the current IL into Cp and C4. Assuming that the current of C4 is denoted by Ic4, a voltage rise dV/dt between the drain and the source of Q2 is limited by Ic4×C4. Further, the current charged in C4 is charged into C2 and the gate voltage of Q2 is further decreased. This makes it possible to stably turn off Q2. In the case of removing the capacitor C4, with increase of a drain voltage of Q2, the voltage of the capacitor C2 is increased and the voltage of the capacitor C2 is increased as well. On the other hand, the gate voltage of Q2 is decreased. Hence, Q2 is never turned on again after Q2 is turned off. At a time point when Q2 is turned off, the current IL is caused to flow through a resonant passage of Lr, Cr and Cp, which serves to progressively decrease the voltage of the capacitor Cp. Further, the voltage between the drain and the source of Q2 is substantially zero. It means that no switching loss exists which loss might be caused if the current of Q2 is overlapped with the voltage of Q2.

In turn, when Q2 is turned off, the current IL is kept flowing through a passage of Lr, Cr and Cp. During this period, the electromagnetic energy accumulated in Lr causes the current IL to flow through the passage. Hence, the current is kept flowing through Cp and reversely charged in Cp as long as the current polarity is constant. On the other hand, the capacitor C2 is discharged by the resistor R2 and the voltage is progressively decreased. This operation is continued until the polarity of the current IL is changed into a negative one.

The change of the polarity of the current IL causes the current IL to flow as discharge current through a passage of Cp, Cr and Lr. The flow of the current Il is continued until the voltage of CP reaches the voltage of the voltage source 15. On the other hand, the voltage between the drain and the source of Q2 is gradually decreased with increase of the voltage of the capacitor Cp.

When the voltage of the capacitor Cp reaches the voltage of the voltage source 15, the current IL is caused to flow through C4 located in parallel to Q2. The current of C4 is reversely charged in C2 and the gate voltage of Q2 is increased. In succession, the electromagnetic energy stored in Lr causes the current IL to continuously flow through a passage of Lr, the voltage source 15, C2, QD2 and Cr. C2 is reversely charged as long as the current polarity is constant. When the gate voltage exceeds the threshold voltage of MOSFET, Q2 is turned on.

During one period of the current IL, the foregoing operation is executed. Later, this operation is repeated.

In the embodiment shown in FIG. 34, the driving circuit of Q2 is arranged as shown in FIG. 32. This arrangement makes it possible to solve the problem of progressively decreasing the gate voltage of Q2 with increase of the capacitor voltage Vc2, thereby reducing the current performance.

In the case of building the lighting circuit in a connector of an incandescent lamp, the heat of the discharge tube raises the temperature inside of the connector up to about 100° C. Hence, the lighting circuit has to keep the constant operation even under the high temperature environment. The phase shift means connected to the gate terminal of the switching element may be used as impedance for compensating for a temperature by changing an impedance value at a high temperature. The present invention enables to stabilize the operation even at a high temperature. It means that the present invention may be also suitable to a bulb type fluorescent lamp having the lighting circuit built in the connector of the light.

The lighting device for illumination according to the present invention makes it possible to guarantee a stable resonant operation in synchronous to a resonant frequency of a load and a current even when the resonant conditions are changed by varying a resonant load composed of a discharge tube, a resonant inductor and a resonant capacitor. Further, since the lighting circuit may be composed of inexpensive parts, the present invention is economical.

What is claimed is:

1. A lighting device for illumination for applying an AC voltage to resonant means and supplying AC current to a discharge tube connected to said resonant means, said lighting device comprising:

a bridge circuit having an N-channel power semiconductor element on a high voltage side and a P-channel power semiconductor element on a low voltage side;

a resonant means connected to said discharge tube; and a first voltage drop means, wherein said resonant means and said first voltage drop means are connected in series between input and output terminals of said bridge circuit, and a voltage of said first voltage drop means is applied to control terminals of said N-channel power semiconductor element and said P-channel power semiconductor element through phase shift means, wherein said first voltage drop means has a capacitor.

2. A lighting device for illumination according to claim 1, wherein said phase shift means has a capacitor.

3. A lighting device for illumination according to claim 1, wherein said phase shift means has an inductor.

4. A lighting device for illumination according to claim 1, wherein said phase shift means has a resistor.

5. A lighting device for illumination for applying an AC voltage to resonant means and supplying AC current to a discharge tube connected to said resonant means, said lighting device comprising:

a bridge circuit having an N-channel power semiconductor element on a high voltage side and a P-channel power semiconductor element on a low voltage side;

a resonant means connected to said discharge tube; and a first voltage drop means, wherein said resonant means and said first voltage drop means are connected in series between input and output terminals of said bridge circuit, and a voltage of said first voltage drop means is applied to control terminals of said N-channel power semiconductor element and said P-channel power semiconductor element through a first phase shift means and a second phase shift means, respectively.

* * * * *